US006466359B2

(12) United States Patent
Sunagawa

(10) Patent No.: US 6,466,359 B2

(45) Date of Patent: Oct. 15, 2002

(54) MULTI-BEAM EXPOSURE APPARATUS

(75) Inventor: Hiroshi Sunagawa, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/839,535

(22) Filed: Apr. 23, 2001

(65) Prior Publication Data

US 2002/0012153 A1 Jan. 31, 2002

(30) Foreign Application Priority Data

Apr. 21, 2000 (JP) ....................................... 2000-120385

(51) Int. Cl.[7] .............................. G02F 1/33; G02F 1/29

(52) U.S. Cl. ....................................... 359/305; 359/315

(58) Field of Search ................................ 359/298, 290, 359/292, 305, 315; 347/241, 243, 130; 250/578.1

(56) References Cited

U.S. PATENT DOCUMENTS

| | | | |
|---|---|---|---|
| 3,902,048 A | 8/1975 | Fleischer et al. | 235/462.3 |
| 3,919,527 A | 11/1975 | Bowen et al. | 235/462.3 |
| 3,947,816 A | 3/1976 | Rabedeau | 235/462.4 |

(List continued on next page.)

FOREIGN PATENT DOCUMENTS

| | | | |
|---|---|---|---|
| JP | 54-819 | 1/1979 | G06K/7/10 |
| JP | 51-33710 | 3/1979 | |
| JP | 59-47019 A | 4/1981 | G02B/27/17 |
| JP | 64-48017 | 2/1989 | G02B/26/10 |

OTHER PUBLICATIONS

PSC Magellan SL 360–Degree Scanner/Scale by PSC Inc., www.pscnet.com/magslspe.html#spec5, 2000.

Fujitsu Slimscan by Fujitsu Systems of America, Fijitsu System of America, vol. 0, No. 0 1991.

Low–Profile Holog Raphic Bar Code Scanner by LeRoy Dickson and Robert Cato, IBM Technical Disclosure Bulletin., vol. 31, No. 12, 1989, pp. 205–206.

Dual–Purpose Holographic Optical Element for a Scanner by IBM Corp., IBM Technical Disclosure Bulletin, vol. 29, No. 7, 1986, pp. 2892–2893.

Chromatic Correction for a Laser Diode/Holographic Deflector by G.T. Sincerbox, IBM Technical Disclosure Bulletin, vol. 27, No. 5, 1984, pp. 2892–2893.

Aberrant Holographic Focusing Element for Post–Objective Holographic Deflector by L. D. Dickson, IBM Technical Disclosure Bulletin, vol. 26, No. 12, 1984, pp. 6687–6688.

Holography in the IBM 3687 Supermarket Scanner by LeRoy D. Dickson, et. al., IBM Journal of Research and Development, vol. 26, No. 2, 1982, pp. 228–234.

Correction of Astigmatism for Off–Axis Reconstruction Beam Holographic Deflector by L.D. Dickson, IBM Technical Disclosure Bulletin, vol. 23, No. 9, 1981, pp. 4255–4256.

Hologram Scanner for POS Bar Code Symbol Reader by Hiroyuki Ikeda, et. al., Fujitsu Scientific & Technical Journal, vol. 15, No. 1, 1979, pp. 59–77.

*Primary Examiner*—Ricky Mack
*Assistant Examiner*—Omar Z. Hindi
(74) *Attorney, Agent, or Firm*—Sughrue Mion, PLLC

(57) ABSTRACT

The multi-beam exposure apparatus includes a light source for emitting a specified number of multi-beams spaced apart in a direction of auxiliary scanning, a deflecting unit for deflecting the specified number of multi-beams collectively on main scanning lines by a specified number of deflections such that a space between adjacent ones of the specified number of multi-beams is exposed and a main scanning unit for performing main scan of a recording material as it is exposed with the specified number of multi-beams, wherein the space between adjacent ones of the specified number of multi-beams is an integral multiple of (the specified number of deflections +1) multiplied by a pitch of pixels in the direction of auxiliary scanning.

21 Claims, 10 Drawing Sheets

U.S. PATENT DOCUMENTS 3,978,317 A 8/1976 Yamaguhib et al. ..... 235/462.3
4,006,343 A 2/1977 Izura et al. ................ 235/470
4,026,630 A 5/1977 Wollenmann ............... 359/17
4,093,865 A 6/1978 Nickl ......................... 250/566
4,097,729 A 6/1978 Seligman et al. ........ 235/462.4
4,113,343 A 9/1978 Pole et al. .................... 359/17
4,333,006 A 6/1982 Gorin et al. ............ 235/462.3
4,364,627 A 12/1982 Haines ........................ 359/23
4,378,142 A 3/1983 Ono ............................ 359/18
4,415,224 A 11/1983 Dickson ...................... 359/18
4,416,505 A 11/1983 Dickson ...................... 359/12
4,428,643 A 1/1984 Kay ............................ 359/18
4,429,946 A 2/1984 Haines ........................ 359/22
4,591,242 A 5/1986 Broockman et al. .......... 359/77
4,610,500 A 9/1986 Kramer ....................... 359/18
4,639,070 A 1/1987 Ieda et al. .............. 235/462.3
4,647,143 A 3/1987 Yamazaki et al. ............ 359/18
4,652,732 A 3/1987 Nicki ...................... 235/462.4
4,713,532 A 12/1987 Knowles ................. 235/462.4
4,748,316 A 5/1988 Dickson ..................... 235/454
4,753,502 A 6/1988 Ono ............................ 359/18
4,758,058 A 7/1988 Cato et al. .................... 359/18
4,766,298 A 8/1988 Meyers ................... 235/462.4
4,790,612 A 12/1988 Dickson ...................... 359/12
4,794,237 A 12/1988 Ferrante ................. 235/462.3
4,795,224 A 1/1989 Goto .......................... 359/211
4,800,256 A 1/1989 Brookkman et al. ..... 235/462.2
4,861,973 A 8/1989 Hellekson et al. ....... 235/462.4
4,904,034 A 2/1990 Narayan et al. .............. 359/17
4,957,336 A 9/1990 Hasegawa et al. ............ 359/17
4,960,985 A 10/1990 Knowles ................. 235/462.4
4,973,112 A 11/1990 Kramer ....................... 359/17
5,000,529 A 3/1991 Katoh et al. ................ 359/216
5,026,975 A 6/1991 Guber et al. ............. 235/462.1
5,039,184 A 8/1991 Murakawa et al. ......... 359/216
5,073,702 A 12/1991 Schuhmacher ........... 235/462.2
5,124,537 A 6/1992 Chandler et al. ........ 235/462.1
5,132,524 A 7/1992 Singh et al. ............. 235/462.3
5,144,118 A 9/1992 Actis et al. .............. 235/462.1
5,153,417 A 10/1992 Sakai et al. .............. 235/462.3
5,162,929 A 11/1992 Roddy et al. ................. 359/17
5,170,180 A 12/1992 Doi ............................ 347/232
5,206,491 A 4/1993 Katoh et al. ............. 235/462.4
5,212,370 A 5/1993 Wittensoldner et al. .... 235/472
5,216,230 A 6/1993 Nakazawa .................. 235/454
5,229,588 A 7/1993 Detwiler et al. ......... 235/462.3
5,286,961 A 2/1994 Saegusa ................... 235/462.4
5,296,689 A 3/1994 Reddersen et al. ...... 235/462.2
5,361,158 A 11/1994 Tang ....................... 235/462.4
5,459,308 A 10/1995 Detwiler et al. ......... 235/462.3
5,475,207 A 12/1995 Bobba et al. ............ 235/462.4
5,484,990 A 1/1996 Lindacher et al. ....... 235/462.2
5,491,328 A 2/1996 Rando ..................... 235/462.1
5,495,097 A 2/1996 Katz et al. ............... 235/462.1
5,504,595 A 4/1996 Moron et al. ................. 359/16
5,510,605 A 4/1996 Miyazaki ................. 235/462.4
5,515,097 A 5/1996 Munechika et al. ........ 347/241
5,517,359 A * 5/1996 Gelbart ....................... 359/623
5,550,655 A 8/1996 Kayashima et al. .......... 359/17
5,555,130 A 9/1996 Marom et al. .............. 359/574
5,557,093 A 9/1996 Knowles et al. ......... 235/462.3
5,684,289 A 11/1997 Detwiler et al. ......... 235/462.3
5,689,102 A 11/1997 Schonenberg et al. ... 235/462.3
5,693,930 A 12/1997 Katoh et al. ............. 235/462.3
5,705,802 A 1/1998 Bobba et al. ............ 235/462.3
5,723,852 A 3/1998 Rando et al. ............ 235/462.4
5,801,370 A 9/1998 Katoh et al. ................ 235/462
5,814,803 A 9/1998 Olmstead et al. ........... 235/462
5,837,988 A 11/1998 Bobba et al. ............... 235/472
5,869,827 A 2/1999 Rando ..................... 235/462.4
5,886,336 A 3/1999 Tang et al. ................... 303/37
5,896,162 A 4/1999 Taniguchi ................... 347/244

* cited by examiner

FIG. 6
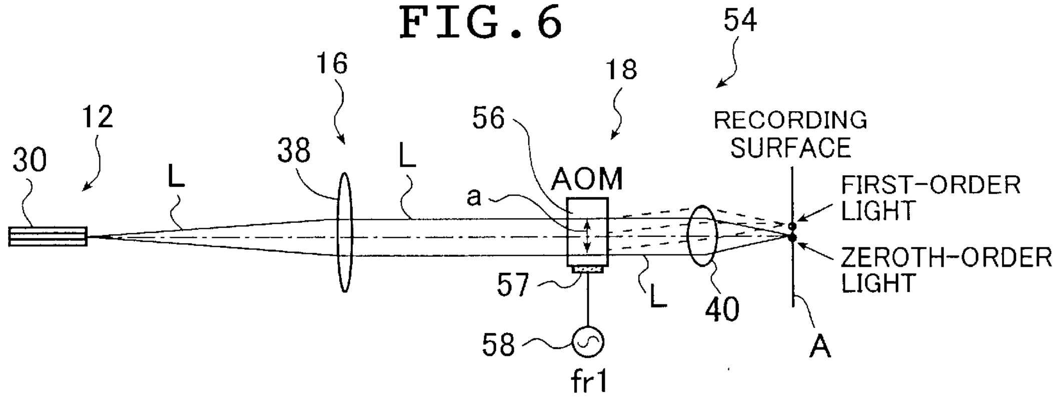
FIG. 7A
FIG. 7B
FIG. 7C
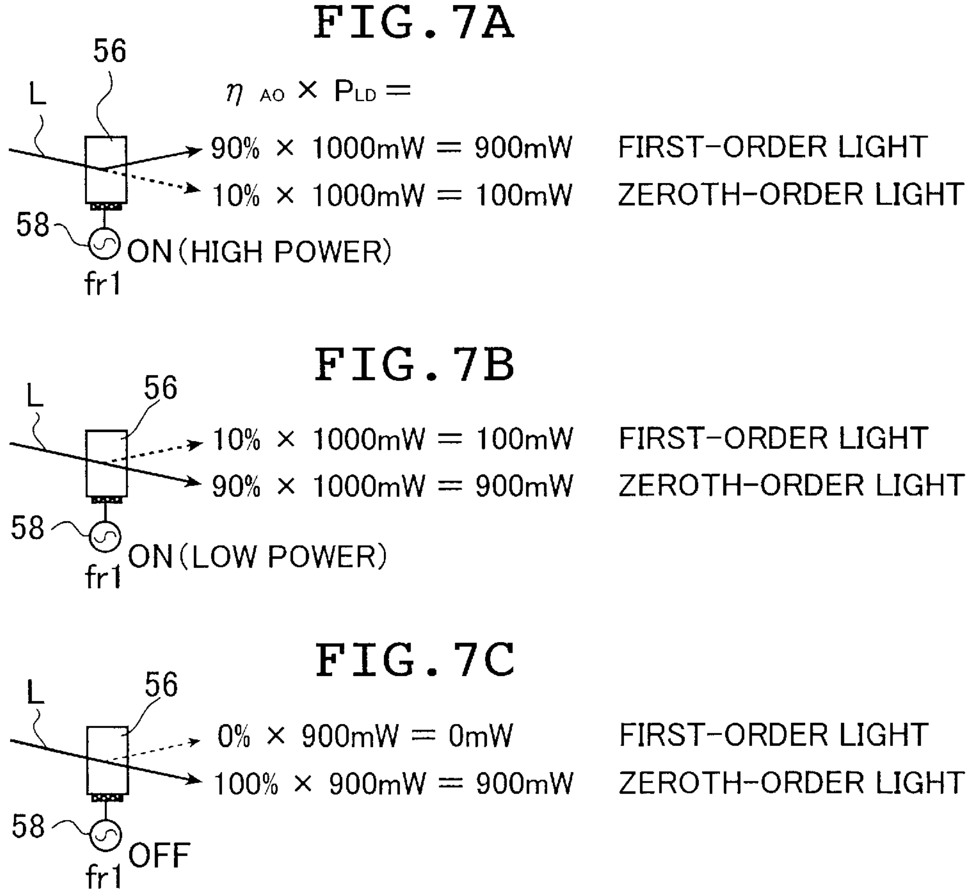

MAIN SCAN; 1 / 2 PIXEL(p)

FINE DEFLECTION; $\sqrt{5}$ / 2 PIXEL(p)

pf= $4\sqrt{5}$ p

MAIN SCAN; 1 / 2 PIXEL(p)

FINE DEFLECTION; $\sqrt{5}$ / 2 PIXEL(p)

pf= $4\sqrt{5}$ p

MULTI-BEAM EXPOSURE APPARATUS

BACKGROUND OF THE INVENTION

1. Technical Field

This invention relates to a multi-beam exposure apparatus that performs exposure by imaging a multi-beam light source onto recording materials such as photoreceptors, light-sensitive materials and heat-sensitive materials.

2. Prior Art

Lithographic platemaking using PS (presensitized) plates is quite common in the printing industry. To print a color image, reading with a scanner is done in three separated colors R (red), G (green) and B (blue), the image signals for these three colors are converted to color separated halftone signals for four colors C (cyan), M (magenta), Y (yellow) and Bk (black), light-sensitive materials called "lith films" are exposed for the respective colors by means of light beams modulated on the basis of the resulting color separated halftone signals so as to prepare lith plates for the respective colors, and halftone images for the respective colors are formed by exposure on PS plates using the prepared lith plates. As a result, lithographic printing plates of four colors C, M, Y and Bk are produced.

In recent years, direct platemaking and CTP (computer to plate) are drawing increasing attention since they contribute to simplifying the platlemaking process and shortening the time taken by it. These techniques eliminate the lith films and printing plates are made by drawing images directly on PS plates with light beams such as laser beams using the color separated halftone signals for four colors C, M, Y and Bk that have been acquired with the scanner system.

In order to produce print images of higher contrast and quality, the recording density mutst be increased up to 2400–2540 dpi so that the spot diameter of light beams that form halftone dots is reduced to about 10.0–10.6 $\mu$m. While it is necessary to form finer beam spots by increasing the density of printed images, a further reduction of the platemaking time is required and PS plates as large as 1100 mm×950 mm are desirably exposed in the shortest possible time, say, within a period of several minutes. This requirement for accomplishing high-density exposure of large areas exists not only in the printing field but also in many image recording areas.

In the case of the above-mentioned large-sized PS plates, high-density exposure with a single light beam requires that the drum (external drum) fitted with the PS plate should rotate for main scan at a speed of 10,000 rpm or more. However, from structural and control viewpoints, this need is almost impossible to meet at low cost.

Since high-density exposure with a single light beam cannot be achieved in a shorter time, it has been proposed that the exposure time be shortened by drawing several lines with a plurality of light beams. An apparatus operating on this principle is called a multi-beam exposure apparatus and relevant prior art examples are disclosed in U.S. Pat. No. 5,517,359, Japanese Patent Application (JPA) No. 1864901994 and International Publication (WO) No. 97/27065.

U.S. Pat. No. 5,517,359 teaches an apparatus for imaging the light from a laser diode on a multi-channel linear light valve; the light from 19 emitters of a high-power (ca. 1 W) BALD (broad area laser diode) is imaged onto the linear light valve by means of a lens array in which the pitch between lenses is substantially the same as the pitch of the emitters; the images of the respective emitters are superposed and the small linear light valve is illuminated (coupled) with a high-power (20 W in total) LD (laser diode) array so that the desired image is formed on a heat-sensitive or light-sensitive material to realize effective CTP.

Since the small linear light valve array is illuminated with the 20 W high-power LD array, the apparatus requires fine adjustment of the relative positions of the two arrays. This poses two problems. First, if the LD light source fails, it must be replaced by a new LD array but the necessary adjustment is too complex to be performed by the user and the apparatus has to be brought to the factory or any appropriate service center where time-consuming repair and expensive parts replacement are performed. Second, in order to increase the reliability of the apparatus, the operating life of the high-power LD array has to be extended but this requires water cooling of the LD array, making the structure of the apparatus complex and increasing its cost.

The multi-beam recording apparatus disclosed in Japanese Patent Application (JPA) No. 186490/1994 comprises a plurality of light source portions each consisting of a discrete LD and collimating unit and which are arranged in a specified pattern to illuminate a perforated plate having a plurality of apertures formed in a pattern either identical or similar to the pattern of arrangement of the light source portions; light beams passing through the apertures are directed to imaging (reducing) optics so that they are imaged on a light-sensitive material (recording surface). With this recording apparatus, the individual light source portions need not be positioned in the specified pattern of arrangement in high precision and there is no need for prolonged adjustment but high-quality images can be recorded after simple adjustment.

If this apparatus is used to perform high-speed recording of large-sized PS plates, as many as several tens of light source portions must be used and in order to arrange them in a specified pattern, a light source unit of a comparatively large size must be employed.

The apparatus described in JPA No. 186490/1994 does not require as precise positioning as in the case where no perforated plate is used but, on the other hand, the apertures in the perforated plate must be aligned with the exit centers of the light beams from the respective LDs and replacement of a failing LD requires reasonably high positional precision and involves a complicated procedure. Second, due to the use of many expensive high-power LDs, the cost of the light source unit increases and the overall system reliability of the apparatus decreases. Thirdly, the light beams from all light source portions in the large-sized light source unit must be received by lenses, a parabolic mirror and other optical components of high precision and large size and, in addition, complex reducing (imaging) optics are required to reduce these light beams to a sufficiently small size on the recording surface of the light-sensitive material; these contribute to increasing the cost of the apparatus.

International Publication (WO) 97/27065 discloses an imaging apparatus for exposing platemaking materials and a platemaking apparatus using the same. In these apparatus, a plurality of 0.5–1.0 W optical fiber coupled LDs are arranged and a pattern of light beams emerging from the fibers are passed through telecentric optics so that they are imaged (exposed at smaller scale) on a platemaking material (heat-sensitive material or heat ablation material) fitted on an external drum so that the position and size of the exposing spot will have a specified precision in spite of changes in the distance from the exit end face of each fiber to the recording surface of the platemaking material.

If this apparatus is used in order to expose platemaking materials of the above-indicated large size within a duration on the order of several minutes, as many as several tens of LDs have to be used but then the cost of the apparatus increases and its overall system reliability decreases. If the number of LDs is reduced to, say, 24, the exposure time prolongs and the productivity decreases.

Ordinary laser printers use a polygonal mirror which deflects a single laser beam for main scan in a direction parallel to the rotating axis of a photoreceptor drum and they feature a much smaller size and a lower density than the platemaking apparatus. Japanese Utility Model Application (JMA) No. 137916/1986 proposes a laser printer which uses an acousto-optic light deflector (AOD) to deflect a laser beam in an auxiliary scanning direction (in which the photoreceptor drum rotates) so that a pluality of lines (raster) are recorded simultaneously by one cycle of main scan. In order to reduce the visibility of jaggies that frequently occur in low-density image forming apparatus, Japanese Patent No. 2783328 discloses an image forming apparatus that relies on the same principle of deflection and main scanning as the above-described laser printer and which uses an AOD or an electro-optic light defelctor (EOD) to perform deflection in a zigzag path so that odd and even lines are offset by half a pixel to ensure that oblique lines in characters and so forth will look smooth.

The above-described laser printer and image forming apparatus which use a polygonal mirror to deflect a laser beam for main scan have a common problem in that if multiple laser beams are used, the size of the polygonal mirror increases and controlling the polygonal mirror such that it rotates consistently becomes difficult to achieve or that if more than one polygonal mirror is used to handle the multiple laser beams, difficulty is encountered in controlling the polygonal mirrors. In any event, the polygonal mirror or mirrors are expensive and cannot be applied to the purpose of performing high-density exposure of large-sized platemaking materials.

The image forming apparatus disclosed in Japanese Patent No. 2783328 has another problem in that the pixel density cannot be adequately increased.

If a single light beam is used as by the apparatus disclosed in Japanese Utility Model Application (JMA) No. 137916/1986 and Japanese Patent No. 2783328, the method of recording two or more lines simultaneously during one cycle of deflection for main scan using an AOD, AOM or the like is not applicable to the purpose of performing high-density exposure of large-sized platemaking materials.

Turning back to the multi-beam exposure apparatus disclosed in U.S. Pat. No. 5,517,359, JPA No. 186490/1994 and WO 97/27065, if one wants to shorten the duration of high-density exposure of large-sized platemaking materials with a small number of multi-beams, the main scan speed has to be increased by increasing the number of revolutions of the external drum to, for example, about 2000 rpm or more. However, the drum capable of high speed rotation is not only very expensive but it also has the risk of causing the fitted printing plate to spin off. A lower speed of the drum is advantageous from the viewpoints of cost and safety but, on the other hand, the exposure time is prolonged.

If the number of multi-beams used in the multi-beam exposure apparatus is increased by a sufficient degree to achieve the intended high-density exposure of large-sized platemaking materials, the problems of high drum cost and prolonged exposure time are dissolved but, on the other hand, LDs or other light sources to be used for issuing light beams increases and the associated parts increase correspondingly in number to eventually increase the overall cost of the apparatus.

The increase in the number of light sources such as LDs causes the problem of higher failure rate. Suppose that if ten LDs are lit simultaneously, the first failure occurs 10,000 hours later. If a hundred LDs are lit simultaneously, the first failure occurs 1,000 hours later. This means that the shutdown period of the apparatus and, hence, the cost of servicemen increase. As a result, the reliability of the apparatus decreases.

SUMMARY OF THE INVENTION

An object, therefore, of the present invention is to provide a multi-beam exposure apparatus that is suitable for high-density recording on large-sized recording materials by multi-beam exposure and which is capable of exposing within a short time (1–3 minutes) without substantial increase in the number of light beams from light sources such as semiconductor lasers and without increasing the main scan speed such as the rotating speed of an external drum and which has the additional advantages of safety, a small number of parts, low cost, low failure rate of the light sources such as semiconductor lasers, high reliability of the exposing system, short shutdown time and low cost of servicemen.

This object of the invention can be attained by a multi-beam exposure apparatus comprising a light source for emitting a specified number of multi-beams spaced apart in the direction of auxiliary scanning, a deflecting unit for deflecting said specified number of multi-beams collectively on main scanning lines by a specified number of deflections such that the space between adjacent ones of said specified number of multi-beams is exposed, and a main scanning unit for performing main scan of a recording material as it is exposed with said specified number of multi-beams, further characterized in that the space between adjacent ones of said specified number of multi-beams is an integral multiple of (said specified number of deflections +1) multiplied by the pitch of pixels in the direction of auxiliary scanning.

In order to attain the object described above, the present invention provides a multi-beam exposure apparatus comprising: a light source for emitting a specified number of multi-beams spaced apart in a direction of auxiliary scanning; a deflecting unit for deflecting the specified number of multi-beams collectively on main scanning lines by a specified number of deflections such that a space between adjacent ones of the specified number of multi-beams is exposed; and a main scanning unit for performing main scan of a recording material as it is exposed with the specified number of multi-beams, wherein the space between adjacent ones of the specified number of multi-beams is an integral multiple of (the specified number of deflections +1) multiplied by a pitch of pixels in the direction of auxiliary scanning.

Preferably, the main scanning unit is a rotating outer drum having the recording material fitted on its peripheral surface.

Preferably, the light source is multi-beam emitting unit in array form.

Preferably, the light source is an optical fiber array emitting the multi-beams.

Preferably, the light source is an array of discrete semiconductor lasers emitting individual beams.

Preferably, the light source is a monolithic semiconductor laser array emitting the multi-beams.

It is preferable that the further comprises a collimator lens provided between the light source and the deflecting unit and an imaging lens provided between the deflecting unit and the recording material.

It is also preferable that the multi-beam exposure apparatus further comprises reducing optics provided in a plurality of stages between the deflecting unit and the collimator lens.

Preferably, the deflecting unit has an acousto-optic effect device.

Preferably, the acousto-optic effect device is an acousto-optic deflector.

Preferably, the acousto-optic effect device is an acousto-optic modulator.

Preferably, light of first-order diffraction and that of zeroth-order diffraction as being output from the acousto-optic modulator are adjusted to have equal intensity.

Preferably, the multi-beams are deflected by the acousto-optic effect device in a direction perpendicular to a direction in which the multi-beams are arranged.

Preferably, a direction of ultrasonic propagation from the acousto-optic effect device is adjusted to be perpendicular to a direction in which the multi-beams are arranged.

Preferably, the deflecting unit has an optical device capable of electro-optic effect.

Preferably, the multi-beams are deflected by the optical device capable of the electro-optic effect in a direction parallel to a direction in which the multi-beams are arranged.

Preferably, the multi-beams are deflected by the optical device capable of the electro-optic effect in a direction perpendicular to a direction in which the multi-beams are arranged.

Preferably, the deflecting unit comprises: a polarized beam splitting device for separating the multi-beams into two components according to a direction of polarization; a first polarization rotating device by which the direction of polarization of the component separated by the polarized beam splitting device is rotated so that the direction is parallel to the direction of polarization of the component that has passed through the polarized beam splitting device; a first and a second entity of the optical device capable of the electro-optic effect which respectively deflect a component that has passed through the polarized beam splitting device and a component that has been rotated in the direction of polarization by the first polarization rotating device; a second polarization rotating device for rotating the direction of polarization of a component that has been deflected by the first entity of the optical device capable of the electro-optic effect; and a wave coupling device by which a component of multi-beams that has been rotated in the direction of polarization by the second polarization rotating device is combined with a component that has been deflected by the second entity of the optical device capable of the electro-optic effect.

Preferably, the multi-beam emitting unit in array form are arranged in more than one arrow and the pixels that remain unrecorded between the multi-beams emitted from a single row of the multi-beam emitting unit are thoroughly recorded by the multi-beams emitted from all other rows of the multi-beam emitting unit.

Preferably, the pixels that remain unrecorded between the multi-beams emitted from the multi-beam emitting unit in array form are thoroughly recorded by interlaced exposure.

Preferably, the recording material is a photoreceptor, a light-sensitive material or a heat-sensitive material.

BRIEF DESCRIPTION OF THE DRAWINGS

FIG. 6 is a simplified bottom view of a third example of the imaging unit in the multi-beam exposure apparatus of FIG. 1 as seen in a direction perpendicular to the array direction of the fiber array;

FIGS. 7A, 7B and 7C are illustrations showing how light beams are deflected by accouso-optical modulators in the imaging unit shown in FIG. 6;

THE PREFERRED EMBODIMENTS OF THE INVENTION

The multi-beam exposure apparatus of the invention is described below in detail with reference to the preferred embodiments shown in the accompanying drawings.

Figure 1:
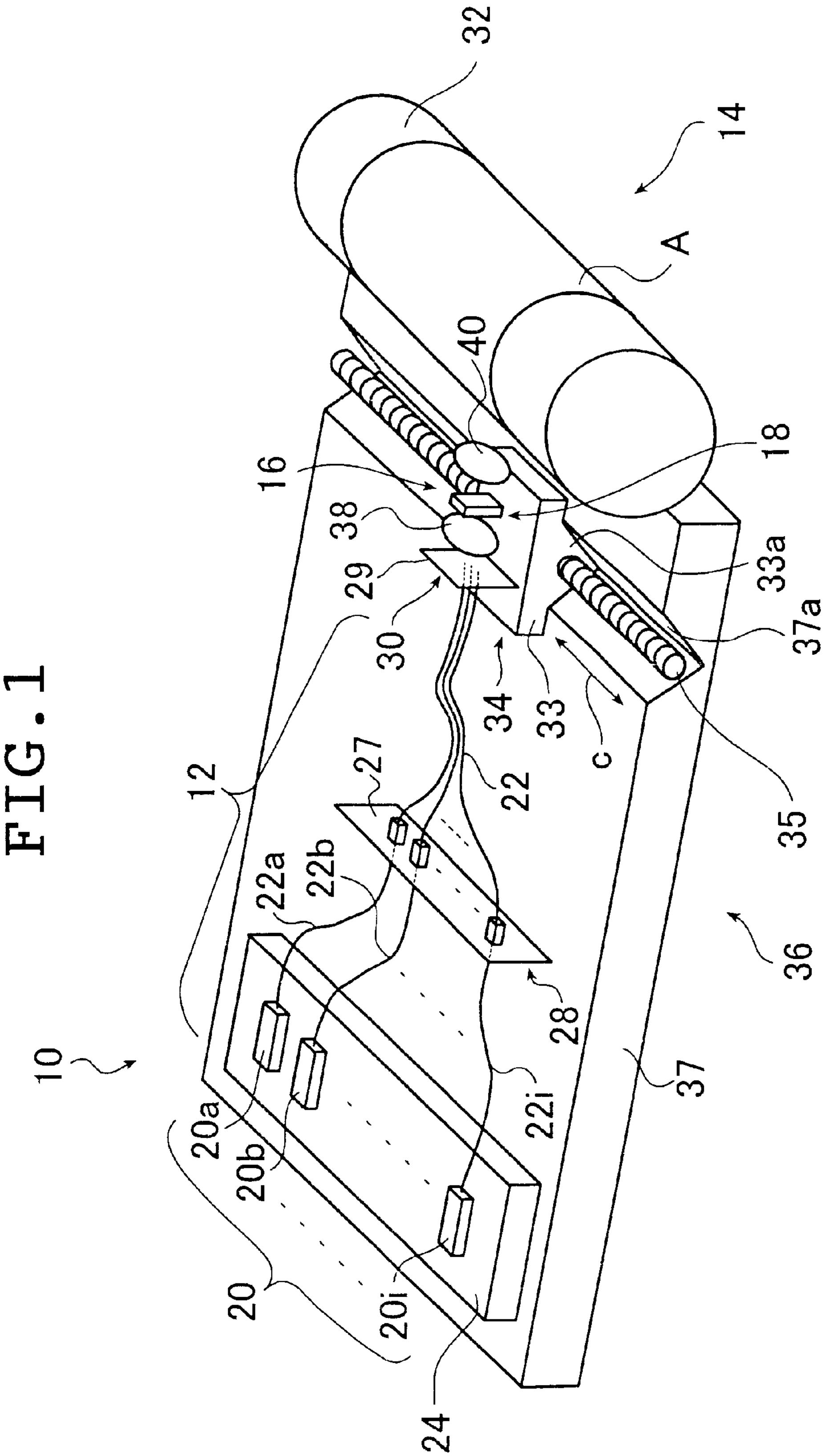
FIG. 1 is a simplified perspective view showing schematically a multi-beam exposure apparatus according to an embodiment of the invention.

FIG. 1 is a simplified diagram showing schematically a multi-beam exposure apparatus according to an embodiment of the invention. The multi-beam exposure apparatus generally indicated by 10 in FIG. 1 is hereunder referred to simply as the exposing apparatus and comprises a light source portion 12 for emitting a specified number of multi-beams spaced apart in the direction of auxiliary scanning, a main scanning portion 14 for performing main scan of a recording material A as it is exposed with the specified number of multi-beams, imaging optics 16 with which the specified number of multi-beams emitted from the light source portion 12 are imaged on the recording material A in the main scanning portion 14, and a fine deflecting portion 18 for deflecting the specified number of multi-beams collectively on main scanning lines by a specified number of deflections such that the space between adjacent ones of the specified number of multi-beams is exposed.

As shown in FIG. 1, the light source portion 12 comprises a specified number (i) of semiconductor laser/fiber coupling units 20*a*, 20*b*, . . . , 20*i* that include semiconductor lasers such as LDs (laser diodes, not shown) which emit a specified number (i) of multi-beams (such coupling units are hereunder referred to simply as LD/fiber coupling units), specified lengths of optical fibers (hereunder referred to as fibers) 22*a*, 22*b*, . . . , 22*i* that are coupled at their entrance end faces to the respective LDs in the LD/fiber coupling units 20 (20*a*–20*i*), and a heat sink 24 which fix the LD/fiber coupling units 20*a* –20*i* in position and hold them at specified temperatures. The light source portion 12 also includes a connector array 28 which binds the fibers 22*a*–22*i* in array form on a support plate 27 in the middle of their path and a fiber array 30 in which the exit end faces of fibers 22*a*–22*i* are spaced apart on a support plate 29 in the direction of auxiliary scanning such that the specified number of multi-beams emitted from the exit end faces of fibers 22*a*–22*i* are spaced apart on the recording material A in the direction of auxiliary scanning.

The LD/fiber coupling units 20 couple the semiconductor lasers (hereunder referred to simply as LDs) to the fibers 22 (22*a*–22*i*) and each consist of a LD, a lens (not shown) with which the laser beam emitted from the LD is imaged on the core at the entrance end face of the associated fiber 22, and the coupling portion of the fiber 22.

In the present invention, the space between adjacent ones of the specified number of multi-beams on the recording material A in the main scanning portion 14 must be an integral of (the specified number of fine deflections by the fine deflecting portion 18 plus 1) multiplied by the pitch of pixels (their space) in the direction of auxiliary scanning.

The light source portion 12 in FIG. 1 is of a LD bound optical fiber array type but this is not the sole type of light sources that can be used in the invention and any beam emitting light sources can be used as long as they can emit multi-beams. Any known light sources in array form can be used, as exemplified by optical fiber arrays such as a multi-mode optical fiber array and a single-mode optical fiber array, monolithic LD arrays, and other LD arrays.

The LDs that can be used in the LD/fiber coupling unit 20 are not limited in any particular way and any known LDs may be used, as exemplified by single-mode LDs, multi-mode LDs and broad area LDs. These LDs may themselves have collimator lenses or apertures.

The optical fibers 20 are not limited in any particular way, either. As long as they permit adequate guiding of light, the optical fibers 22 are preferably as thin as possible so that they can be closely packed in the fiber array 30. Even if the optical fibers 22 are thin, the core diameter should assume the highest possible percentage of the total diameter of the fiber. The heat sink 24 on which the LD/fiber coupling units 20 rest also is not limited in any particular way and may be composed of a metal plate such as an aluminum plate or a Peltier cooling device. Further, the support plate 27 in the connector array 28 and the support plate 29 in the fiber array 30 are not limited in any particular way, either, and various known support plates may be used.

The main scanning portion 14 is for performing exposure of a so-called "external drum" type and comprises a drum 32 which is fitted with the recording material A such as a PS plate on the outer peripheral surface and which rotates in the direction of main scanning, a drive source (not shown) for driving the drum 32 to rotate, and an auxiliary scanning mechanism 36 by which an imaging unit 34 including at least imaging optics 16 and the drum 32 are relatively moved in the direction of auxiliary scanning which crosses the direction of main scanning at right angles.

In order to move the imaging unit 34 in the auxiliary scanning direction relative to the drum 32 as shown in FIG. 1, the imaging unit 34 is preferably an integral assembly of at least the fiber array 30 in the light source portion 12, the imaging optics 16 and the fine deflecting portion 18 which are fixed on a common moving table 33. In this case, the auxiliary scanning mechanism 36 comprises: the moving table 33 which has a linear projection 33*a* and a female thread portion 33*b* extending in the direction indicated by arrow c (the auxiliary scanning direction) parallel to the rotating axis of the drum 32 and which fixes the imaging unit 34 as an integral assembly; a ball screw (driving screw) 35 that meshes with the female thread portion 33*b* in the moving table 33; and a table 37 having a groove 37*a* extending in the auxiliary scanning direction indicated by arrow c to fit the linear projection 33*a* on the moving table 33 and which supports the moving table 33 in such a manner that it is capable of movement by turning the ball screw 35. The linear projection 33*a* on the moving table 33 and the groove 37*a* in the table 37 that fits this projection are not limited to the illustrated triangular form and may assume any other shapes. The moving unit also is not limited to the moving table (travelling nut) 33 which has the female thread portion 33*b* that meshes with the ball screw 35 and it may be of any type that can effect translation of the moving table.

Needless to say, the imaging unit 34 to be moved in the auxiliary scanning direction relative to the drum 32 may be formed integral with all constituent elements of the light source portion 12 including the LD/fiber coupling units 20, fibers 22, heat sink 24 and connector array 28, fixed on a single support table and moved as an integral assembly by, for example, moving the single support table.

Conversely, if the drum is to be moved in the auxiliary scanning direction relative to the imaging unit 34, the two components are preferably moved in unison by either mounting the drive source for the drum 32 on the table (not shown) that rotatably supports the drum 32 or by fixing the support table and the drive source on a separate table.

The recording material A to be used in the main scanning portion 14 is not limited in any particular way and various known recording materials such as PS plates may be used that can record the desired image in either latent or visible form by means of light beams in a photon or heated mode;

examples include platemaking materials such as light-sensitive materials which, upon exposure with a laser having a moderate power as in a photon mode and optional subsequent development, undergoes photochemical reaction in the exposed area to harden the polymer or otherwise become ink- or water-receptive, light- and heat-sensitive materials, heat-sensitive materials and heat ablation materials which, upon exposure to the heat energy provided by a laser of a comparatively high power as in a heated mode, becomes ink- or water-receptive in the exposed area, as well as image recording light-sensitive materials, light- and heat-sensitive materials, light-sensitive and thermally developable materials, heat-sensitive materials and heat ablation materials.

The drum 32 may itself be a photoreceptor drum.

The imaging optics 16 are reducing optics by means of which multi-beams emitted from the light source portion 12 are eventually imaged in specified spot sizes. The imaging optics 16 comprise a collimator lens 38 and an imaging lens 40. The collimator lens 38 is positioned downstream of the fiber array 30 in the travelling direction of light and acts on all light beams from the fiber array 30 so that they are launched into the fine deflecting portion 18 as collimated (parallel) light, and the imaging lens 40 is positioned between the collimator lens 38 and the recording surface A on the periphery of the drum 32 and images the light beams on the recording material A in the main scanning portion 14. The fine deflecting portion 18 is at the focal point of the collimator lens 38 and the imaging lens 40 is so positioned that the light beams passing through or deflected in the fine deflecting portion 18 are imaged in specified spot sizes on the recording surface A on the periphery of the drum 32. The imaging optics 16 are not limited to the illustrated case and any reducing optics may be used as long as they ensure that the multi-beams emitted from the light source portion 12 are eventually imaged in specified spot sizes. If desired, a plurality of such reducing optics may be arranged.

The fine deflecting portion 18 is such that during main scan, multi-beams are subjected to collective fine deflection in a direction perpendicular to the direction (array direction) in which they are arranged. An example of the fine deflecting portion 18 is a device that makes use of the acousto-optic or electro-optic effect to perform collective fine deflection of the multi-beams in a direction perpendicular to the array direction. Examples of deflecting devices that make use of the acousto-optic effect include acousto-optical deflectors (hereunder abbreviated as AODs) and acousto-optical modulators (hereunder abbreviated as AOMs). Examples of deflecting devices that make use of the electro-optic effect include electro-optical deflectors (hereunder abbreviated as EODs). The AODs, AOMs and EODs that can be used in the invention are not limited in any particular way and various known deflecting devices that make use of the acousto-optic or electro-optic effect may be employed.

If multi-beams are emitted from a multi-mode fiber array in the light source portion 12, the light beams cannot be controlled in the direction of polarization. To deal with this problem, the fine deflecting portion 18 may have an EOD used in combination with a polarized beam splitter, a polarization rotator and a wave coupler; an incident light beam is split into two beamlets by the direction of polarization, the direction of polarization of one beamlet is rotated so that it becomes the same as the direction of polarization of the other beamlet, followed by fine deflection with the EOD, and the direction of polarization of the other beamlet is rotated and the two beamlets are combined.

The above-described deflecting devices which make use of the acousto-optic or electro-optic effect are not the sole examples of the fine deflecting portion that can be used in the invention and mechanical deflectors such as mirror light deflectors that use fast responding piezoelectric devices may be used as long as they can perform collective fine deflection of the multi-beams in a direction perpendicular to the array direction.

Described above is the basic structure of the exposing apparatus of the invention. On the pages that follow, the imaging unit 34 to be applied to the exposing apparatus 10 of the invention is described in greater detail with reference to the various embodiments shown in FIGS. 2–14.

Figure 2A:
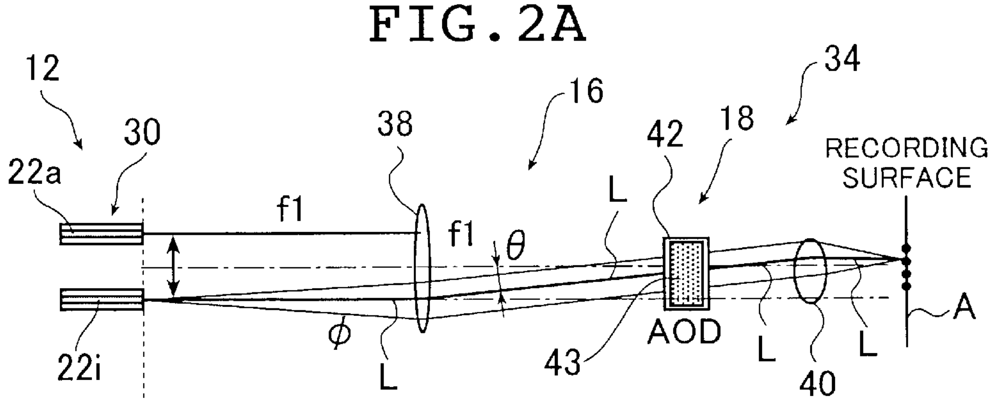
FIG. 2A is a simplified front view of a first example of the imaging unit in the multi-beam exposure apparatus of FIG. 1 as seen in a direction perpendicular to the direction in which optical fibers are arranged in a fiber array.
Figure 2B:
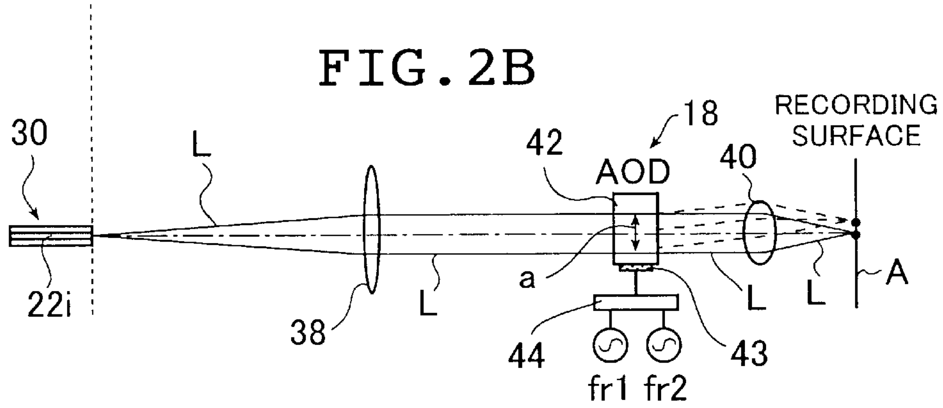
FIG. 2B is a simplified bottom view of the imaging unit as seen in the array direction of the fiber array.
Figure 3:
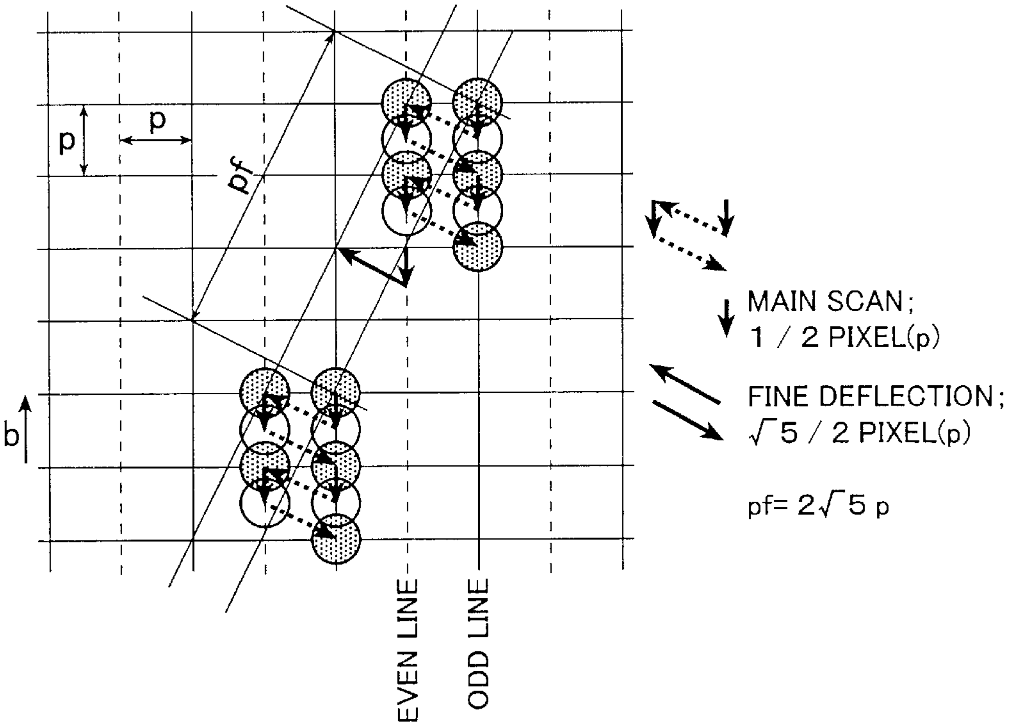
FIG. 3 is an illustration showing how multi-beams from the fiber array in the imaging unit shown in FIG. 2 may be subjected to 2-pixel fine deflection on the image plane.

FIG. 2A is a simplified front view of the imaging unit 34 in the exposing apparatus 10 of FIG. 1 as it is seen in a direction perpendicular to the array direction of the fiber array 30, and FIG. 2B is a simplified bottom view of the same imaging unit 34 as it is seen in the array direction. FIG. 3 is an illustration showing the loci of main scanning actions (2-pixel fine deflections) including the action of fine deflection of multi-beam spots from the fiber array 30 as they scan the surface of the recording material A (which is hereunder referred to simply as the recording surface or image plane A).

The imaging unit 34 shown in FIGS. 2A and 2B is a first embodiment of the invention and comprises the fiber array 30 in the light source portion 12 of the exposing apparatus 10 shown in FIG. 1, as well as the imaging optics 16 and the fine deflecting portion 18.

The fiber array 30 is a multi-mode fiber array. The imaging optics 16 comprise the collimator lens 38 and the imaging lens 40. The fine deflecting portion 18 comprises an AOD 42 and a drive power source 44 which applies voltage for driving the AOD 42.

The collimator lens 38 in the imaging optics 16 is spaced from the fiber array 30 downstream in the travelling direction of light by a distance equal to the focal length f1 of the collimator lens 38. The AOD 42 is positioned downstream of the collimator lens 38 and spaced from it by a distance equal to its focal length fl. The imaging lens 40 is positioned downstream of the AOD 42 to image light beams on the recording surface A of the recording material in the main scanning portion 14.

The multi-beams A collimated (made parallel) by passage through the collimator lens 38 must be launched into the AOD 42 such that they are diffracted exactly at the Bragg angle with respect to the ultrasound from the AOD 42 as shown in FIG. 2B. Therefore, the fiber array 30 and the AOD 42 must satisfy a certain positional relationship such that in the plane the AOD 42 forms (which is normal to the optical axis of the imaging optics 16), the array direction of the fiber array 30 exactly forms the Bragg angle with the direction of ultrasonic propagation from the AOD 42. On the other hand, as FIG. 2A shows, it is not absolutely necessary that in the plane the AOD 42 forms, the multi-beams L be perfectly normal to the direction of ultrasonic propagation from the AOD 42 but they may be slightly inclined. Thus, the AOD 42 has two directions of incidence, one having strict conditions to meet and the other having not, and a multiple of light beams can be launched into the AOD 42 from the less strict direction and deflected collectively in the same manner.

As FIG. 2B shows, the drive power source 44 switches the frequency of the generated ultrasound between fr1 and fr2 on a time basis and changes the period of the diffraction grating which is created by the frequency of changes in the refractive index of the AOD 42, so that the angle of deflection of the incident multi-beams by the AOD 42 is altered by, for example, about 1.0–3.0 degrees. This is how the AOD 42 achieves collective fine deflection of the incident multi-beams L.

Further referring to FIGS. 2A and 2B which show the fine deflection of multi-beams from the fiber array 30 by means of the AOD 42, the following three features are worth mentioning. First, the direction of fine deflection is crossed with the array direction of the fiber array 30 at right angles on the recording material A on the drum 32 shown in FIG. 3.

Second, the array direction of the fiber array 30 is inclined to the auxiliary scanning direction normal to the direction of drum rotation indicated by arrow b in FIG. 3 (which is reverse to the main scanning direction) and the angle of inclination and the fiber pitch pf on the image plane are as shown in FIG. 3, i.e., the points of exposure with light beams L from the individual fibers coincide with the positions of integral pixels on the recording material (image plane) A which correspond to the grid points in FIG. 3; in the illustrated case, the points of exposure are located 4 pixels apart in the main scanning direction and 2 pixels apart in the auxiliary scanning direction.

Thirdly, the direction of deflection is such that when a point of exposure moves by a specified distance (in the illustrated case, by half a pixel in the main scanning direction) to be deflected to an adjacent line, said point of exposure will be located in the position of an integral pixel which in the illustrated case is one pixel away in the auxiliary scanning direction.

Even if the points of exposure with the light beams L from the individual fibers are slightly offset from the positions of integral pixels, the exposing apparatus 10 of the invention can expose the recording material over the entire surface leaving no part of it unexposed. However, if the points of exposure are slightly offset from the positions of integral pixels, they interfere with the period of halftone dots and undesired patterns such as moiré are recorded on the recording material.

Specific discussion is now made with reference to FIG. 3 writing p for the pitch of pixels. A light beam L exposes the position of one pixel on a certain line (odd line) with a specified diameter of spot (indicated by a solid dot in FIG. 3); thereafter, the beam L moves by $(\frac{1}{2})p$ in the main scanning direction while at the same time it is deflected by $(\sqrt{5}/2)p$ in a direction normal to the array direction so as to expose the position of a pixel on an adjacent line (even line) which is adjacent the first mentioned pixel in the auxiliary scanning direction; again, the beam L moves by $(\frac{1}{2})p$ in the main scanning direction while at the same time it is deflected by $(\sqrt{5}/2)p$ in opposite direction which is also normal to the array direction so as to expose the position of a pixel on the initial odd line which is adjacent the first mentioned pixel in the main scanning direction. This process is repeated. An adjacent light beam L which is distant by the fiber pitch pf $(=2\sqrt{5}p)$ repeats the same process of exposing two lines, odd and even, for 2 rasters. In this way, the illustrated imaging unit 34 performs a complete blanket exposure of the recording material A with multi-beams, thereby recording a latent or visible image. Since one light beam exposes two rasters, 32 multi-beams can record 64 rasters simultaneously. The pitch of pixels p is 10 μm if the recording density is 2540 dpi and 10.6 μm if the recording density is 2400 dpi.

For clarity, the spot diameter of light beam L shown in FIG. 3 is made smaller than the pixel pitch p but this is not the sole case of the invention and in a preferred embodiment, the spot diameter of light beam L is made sufficiently larger than the pixel pitch p to permit recording across the pixel.

Described above is the basic structure of the imaging unit 34 in the first embodiment of the invention which performs two-pixel fine deflection of the light beams from the fiber array by means of the AOD.

Figure 4A:
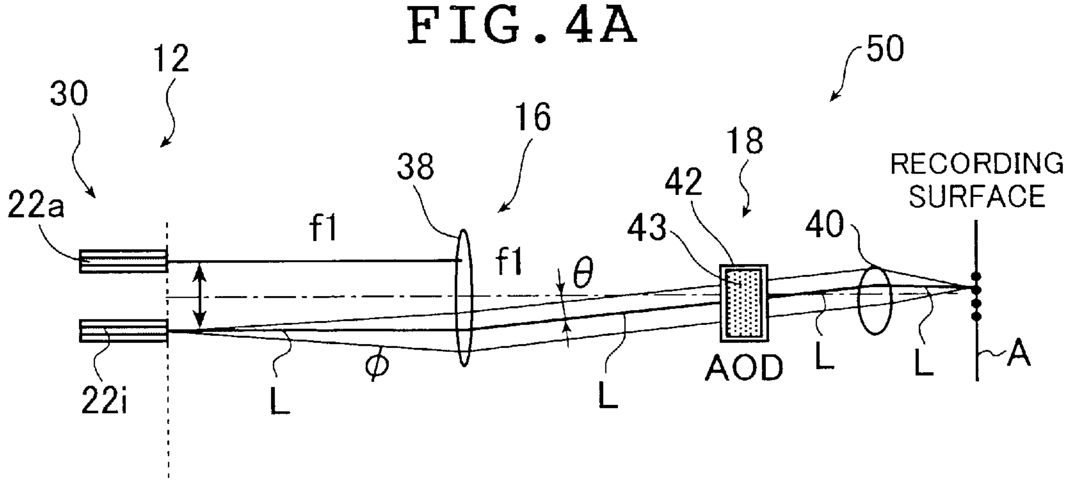
FIG. 4A is a simplified front view of a second example of the imaging unit in the multi-beam exposure apparatus of FIG. 1 as seen in a direction perpendicular to the array direction of the fiber array.
Figure 4B:
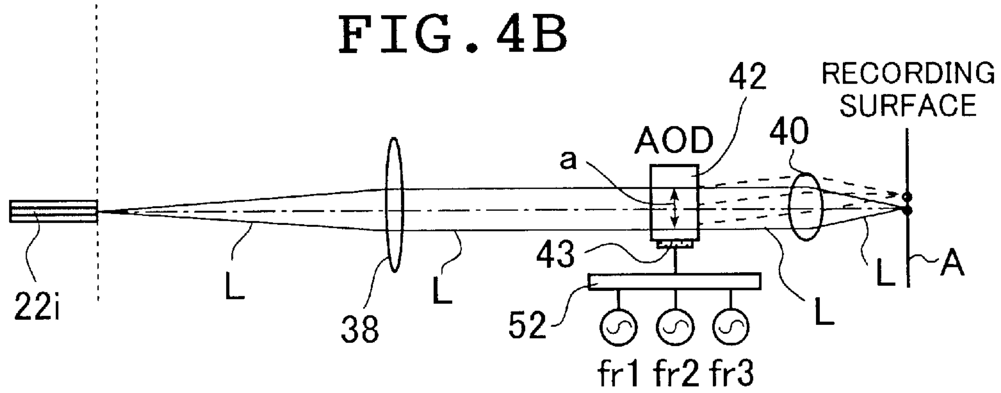
FIG. 4B is a simplified bottom view of the imaging unit as seen in the array direction of the fiber array.
Figure 5:
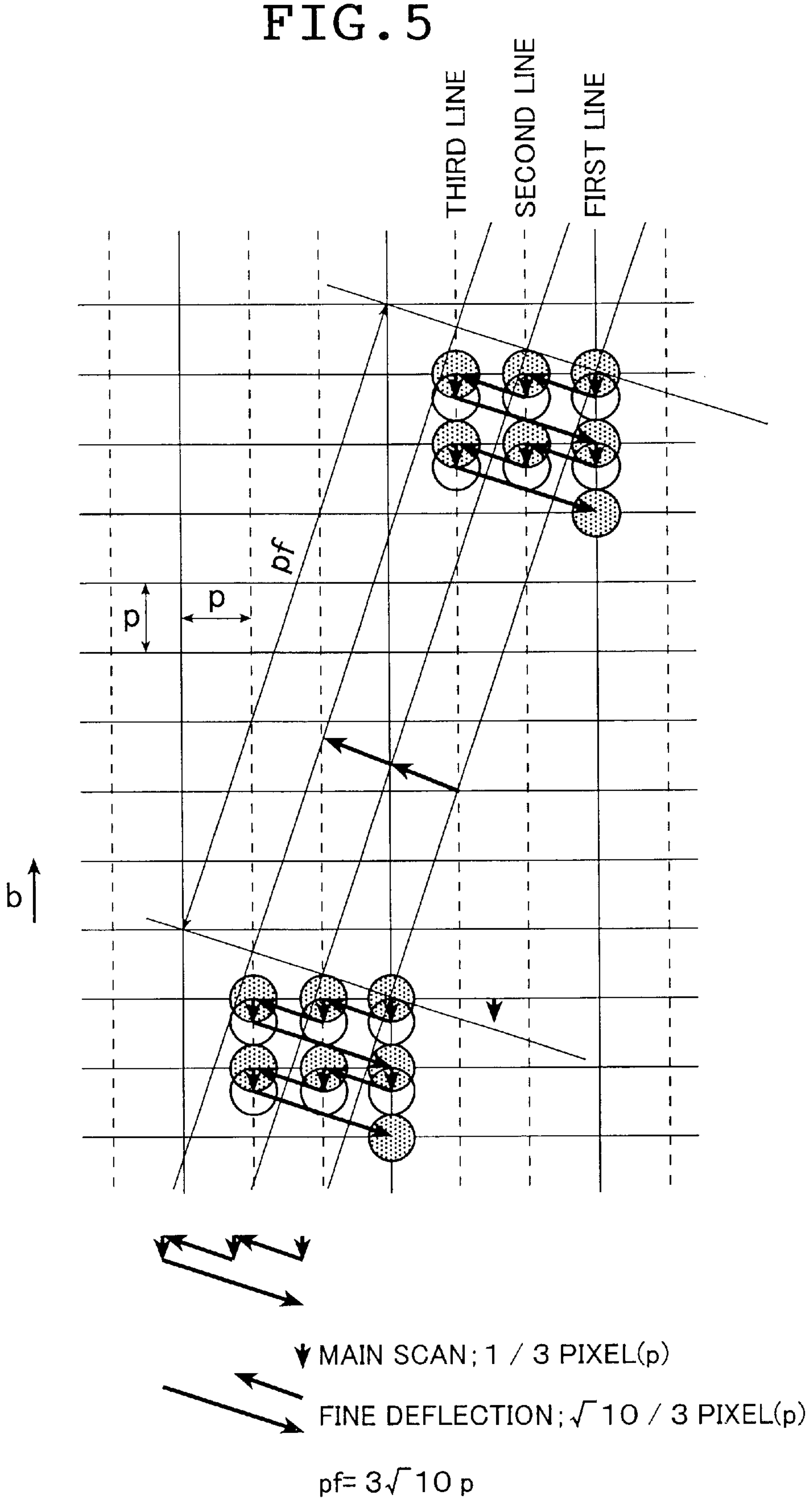
FIG. 5 is an illustration showing how multi-beams from the fiber array in the imaging unit shown in FIG. 4 may be subjected to 3-pixel fine deflection on the image plane.

FIG. 4A is a simplified front view of the imaging unit 50 in a second embodiment of the invention which performs three-pixel fine deflection by the AOD as it is seen in a direction perpendicular to the array direction of the fiber array, and FIG. 4B is a simplified bottom view of the same imaging unit 50 as it is seen in the array direction. FIG. 5 is an illustration showing the loci of main scanning actions (3-pixel fine deflections) including the action of fine deflection of multi-beam spots as they scan the image plane of the recording material A.

The imaging unit 50 shown in FIGS. 4A and 4B has the same construction as the imaging unit 34 shown in FIGS. 2A and 2B except for the drive power source 44 for the AOD 42 in the fine deflecting portion 18. Hence, like constituent elements are identified by like reference numerals and will not be described in detail.

In the imaging unit 50 shown in FIGS. 4A and 4B, a drive power source 52 which switches the frequency of ultrasound between fr1, fr2 and fr3 is substituted for the drive power source 44 shown in FIG. 2B which switches the frequency of ultrasound between fr1 and fr2.

As FIG. 4B shows, the drive power source 52 switches the frequency of the generated ultrasound between fr1, fr2 and fr3 on a time basis and changes the period of the diffraction grating which is created by the frequency of changes in the refractive index of the AOD 42, so that the angle of deflection of the incident multi-beams by the AOD 42 is altered and the AOD 42 achieves collective fine deflection of the incident multi-beams L.

The angle of inclination of the array direction of the fiber array 30 and the fiber pitch pf on the image plane are as shown in FIG. 5, i.e., the points of exposure with light beams L from the individual fibers are located 9 pixels apart in the main scanning direction and 3 pixels apart in the auxiliary scanning direction.

The direction of deflection is such that when a point of exposure moves by one-third of a pixel in the main scanning direction to make one deflection to an adjacent line, said point of exposure will be located one pixel away in the auxiliary scanning direction.

Specific discussion is now made with reference to FIG. 5 writing p for the pitch of pixels. A light beam L exposes the position of one pixel on a certain line (the first line) with a specified diameter of spot (indicated by a solid dot in FIG. 5); thereafter, the beam L moves by p/3 in the main scanning direction while at the same time it is deflected by $(\sqrt{10}/3)p$ in a direction normal to the array direction so as to expose the position of a pixel on an adjacent line (the second line) which is adjacent the first mentioned pixel in the auxiliary scanning direction; the beam L moves by p/3 the main scanning direction while at the same time it is deflected by $(\sqrt{10}/3)p$ in a direction normal to the array direction so as to expose the position of a pixel on an adjacent line (the third line) which is adjacent the second mentioned pixel in the auxiliary scanning direction; again, the beam L moves by p/3 in the main scanning direction while at the same time it is deflected by $2(\sqrt{10}/3)p$ in opposite direction which is also normal to the array direction so as to expose the position of a pixel on the first line which is adjacent the first mentioned pixel in the main scanning direction. This process is repeated. An adjacent light beam L which is distant by the fiber pitch pf (=3√10)p) repeats the same process of exposing three lines, first, second and third lines. In this way, the illustrated imaging unit 50 performs a complete blanket exposure of the recording material A with multi-beams, thereby recording a latent or visible image. Since one light beam exposes three rasters, 32 multi-beams can record 96 rasters simultaneously.

Described above is the basic structure of the imaging unit 50 in the second embodiment of the invention which performs three-pixel fine deflection of the light beams from the fiber array by means of the AOD.

FIG. 7 is a simplified front view of the imaging unit 54 in a third embodiment of the invention which performs two-pixel fine deflection by AOM as it is seen in a direction perpendicular to the array direction of the fiber array 30. FIGS. 7A, 7B and 7C are illustrations showing three different cases for the action of fine deflection of light beams by means of the first-order light (light of first-order diffraction) and the zeroth-order light (light of zeroth-order diffraction) from the AOM.

The imaging unit 54 shown in FIG. 6 has the same construction as the imaging unit 34 shown in FIG. 2B except for the fine deflecting portion 18. Hence, like constituent elements are identified by like reference numerals and will not be described in detail.

In the imaging unit 54 shown in FIG. 6, the fine deflecting portion 18 uses an AOM 56 in place of the AOD 42 shown in FIG. 2B and it also has a drive power source 58 that applies voltage for driving the AOM 56.

The AOM 56 operates by the same principle and has the same construction as the AOD 42. It makes use of the acousto-optic effect, or the diffraction of light by the frequency of changes in refractive index (diffraction grating) that are created by ultrasonic propagation. By altering the drive power from the drive power source 58, the intensity rather than the frequency of ultrasound is changed; in the illustrated case, the frequency fr1 is fixed at, say, 80 MHz and the drive power from the drive power source 58 is changed to perform intensity modulation on the light of first-order diffraction and the light of zeroth-order diffraction. In the case of AOD modulation, it is generally required that the frequency of ultrasound be changed between the two values fr1 and fr2 and the difference between fr1 and fr2 is preferably set approximately at the above-mentioned value of 80 MHz. However, as the center frequency (=(fr1+fr2)/2) increases, the difference between fr1 and fr2 becomes as large as about 200 MHz if the pitch of pixels is about 10 $\mu$m. This increases the cost of the AOD and introduces difficulty in its design. To deal with this situation, the AOM is preferably used and the ultrasonic frequency is fixed at about 80 MHz whereas the drive power for the ultrasonic wave and, hence, its intensity is altered.

This approach is illustrated in FIGS. 7A–7C. Reference is first made to FIG. 7A, in which the multi-mode fiber array 30 emits light beams L having a power ($P_{LD}$) of 1000 mW and the AOM 56 as supplied with a specified drive power (high power) from the drive power source 58 produces light of first-order diffraction with an efficiency ($\eta_{AO}$) of 90%. In this case, the AOM 56 diffracts the incident light beams L to emit deflected light of first-order diffraction at an intensity of 900 mW (as indicated by the solid line). The recording material A fitted around the drum 32 in the main scanning portion 14 is also illuminated with light of zeroth-order diffraction at an intensity of 100 mW (indicated by the dashed line) that has passed through the AOM 56 without being diffracted. If the exposure or heat sensitivity of the recording material A is such that it is fully sensitized with the light beams having an intensity of 900 mW but not sensitized with the light beams having an intensity of 100 mW, it can be prevented from being sensitized by the unwanted light of zeroth-order diffraction (indicated by the dashed line).

Alternatively, as shown in FIG. 7B, the AOM 56 may be supplied with a smaller power from the drive power source 58 so that the efficiency of diffraction is lowered to 10%. In this case, 90% of the incident light beams L simply passes through the AOM 56 which emits light of zeroth-order diffraction at an intensity of 900 mW (as indicated by the solid line) whereas the AOM 56 diffracts 10% of the incident light beams L and emits light of first-order diffraction at an intensity of 100 mW (as indicated by the dashed line). If desired, the drive power source 58 may be turned off so that no drive power is supplied to the AOM 56. In addition, the fiber array 30 is adjusted to produce light beams having a power($P_{LD}$) of 900 mW. Then, as shown in FIG. 7C, all incident light beams L simply pass through the AOM 56 which emits only 900 mW light of zeroth-order diffraction (no light of first-order diffraction is generated).

By any one of these methods, the AOM 56 can perform fine deflection of light beams L to produce finely deflected light beams of the same intensity.

Thus, various methods have been described above by which the multi-beams L emitted from the fiber array 30 are collectively subjected to fine deflection with the AOM 56.

The loci of beam spots that are drawn by exposure with multi-beams as they are subjected to 2-pixel fine deflection in the third embodiment of the invention are entirely the same as shown in FIG. 3 and need not be described in detail.

Described above is the basic structure of the imaging unit 54 in the third embodiment of the invention which performs two-pixel fine deflection of the light beams from the fiber array by means of AOD.

Figure 8A:
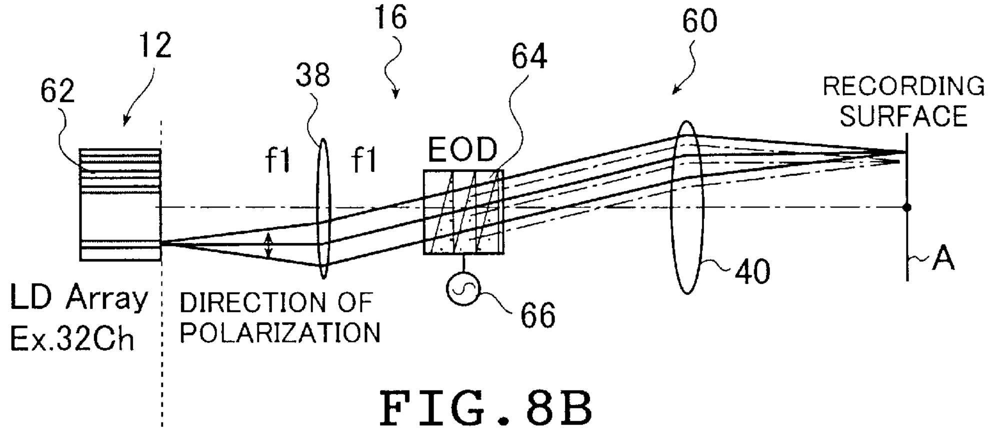
FIG. 8A is a simplified front view of a fourth example of the imaging unit in the multi-beam exposure apparatus of FIG. 1 as seen in the direction in which LDs are arranged in a LD array.
Figure 8B:
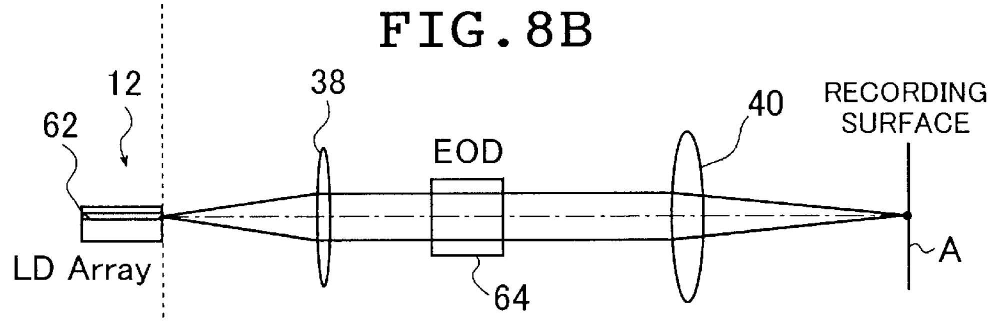
FIG. 8B is a simplified bottom view of the imaging unit.
Figure 9:
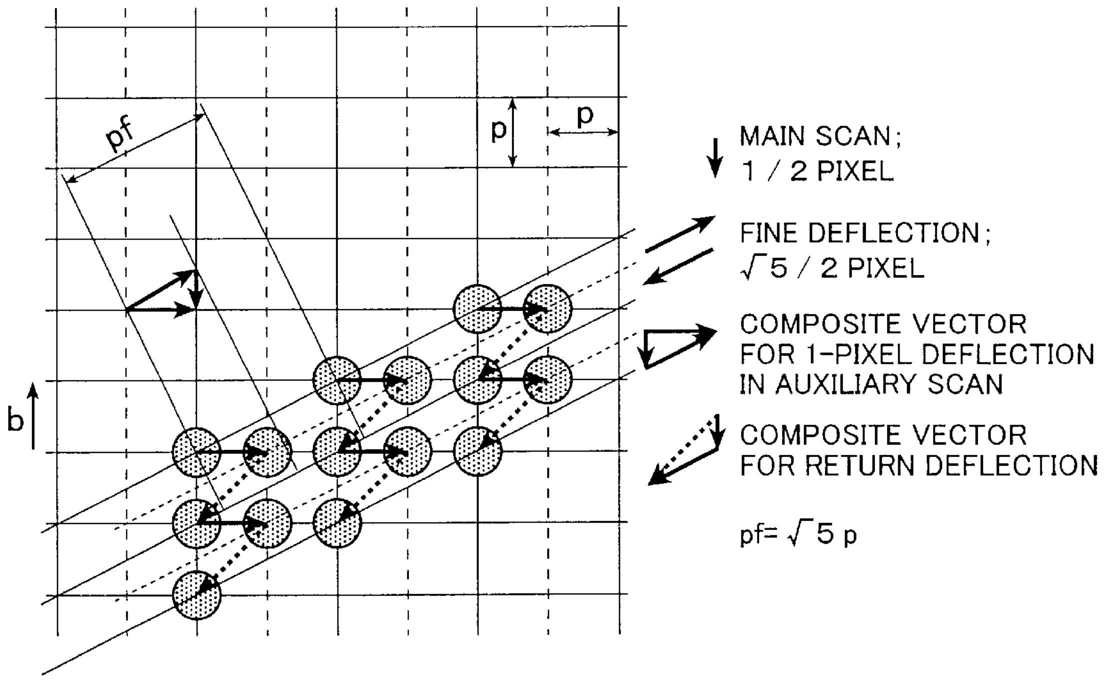
FIG. 9 is an illustration showing how multi-beams may be subjected to 2-pixel fine deflection on the image plane by means of the LD array in the imaging unit shown in FIG. 8.

FIG. 8A is a simplified front view of the exposing apparatus (imaging unit) 60 in a fourth embodiment of the invention which performs two-pixel fine deflection by EOD of light from a monolithic LD array as it is seen in a direction perpendicular to the array direction of the fiber array, and FIG. 8B is a simplified bottom view of the same exposing apparatus 60 as it is seen in the array direction. FIG. 9 is an illustration showing the loci of main scanning actions (2-pixel fine deflections) including the action of fine deflection of multi-beam spots as they scan the surface of the image plane of the recording material A.

The exposing apparatus (imaging unit) 60 shown in FIGS. 8A and 8B has the same construction as the imaging unit 34 shown in FIGS. 2A and 2B except for the light source portion 12 and the fine deflecting portion 18. Hence, like constituent elements are identified by like reference numerals and will not be described in detail.

The exposing apparatus (imaging unit) 60 shown in FIGS. 8A and 8B is the fourth embodiment of the invention and comprises the light source portion 12, imaging optics 16, fine deflecting portion 18 and main scanning portion 14.

In the exposing apparatus 60, the light source portion 12 itself is composed of a monolithic LD array 62 in place of the fiber array 30 shown in FIG. 2A; the imaging optics 16 have the collimator lens 38 and the imaging lens 40 as in the first embodiment, and the fine deflecting portion 18 has an EOD 64 and a drive power source 66 for applying drive voltage to the EOD 64 in place of the AOD 42 and the drive power source 44.

The LDs in the monolithic LD array 62 can individually be turned on and off.

The EOD 64 is a prism of a crystal having large electro-optic effect as exemplified by $KH_2PO_4$ (KDP) or $LiNbO_3$. Upon voltage application, the refractive index of the crystal varies to deflect incident light beams. EODs have fairly fast response speeds of less than 100 ns but they allow for only small angles of deflection. Hence, the EOD 64 consists of two or more prisms (in the illustrated case, six prisms) which are cemented together such that their optical axes are oriented opposite to each other; in this way, the equivalent change in refractive index is increased and the small angle of deflection that is achieved by a single prism is amplified to a sufficiently large value when a plurality of prisms are combined.

The EOD used in the fourth embodiment of the invention is not limited in any particular way and various known types of EOD can be used, as exemplified by the EOD described in IEEE Journal of Quantum Electronics, Vol. QE-9, No. 8, pp. 791–795 (1973).

In the illustrated case, the multi-beams L of the light collimated by passage through the collimator lens 38 are launched into the EOD 64 such that they are exactly at right angles with the direction in which the light beams are deflected by the EOD 64 (see FIG. 8B) whereas the incident beams L are slightly inclined with respect to the interfaces between adjacent prisms in the EOD 64 (see FIG. 8A).

Note that when EOD 64 is used, the direction of polarization of each light beam L incident on the EOD 64 agrees with the array direction in which the multi-beams are arranged.

The illustrated case of fine deflection by the EOD 64 has the following characteristic features. First, as shown in FIG. 8A, the direction of fine deflection of multi-beams L is brought into agreement with the array direction of the monolithic LD array 62. Thus, as shown in FIG. 9, the direction of fine deflection of individual multi-beams L on the recording material A fitted around the drum 32 also agrees with the array direction of the beams.

Second, the array direction of the multi-beams L is inclined with respect to the auxiliary scanning direction which is perpendicular to the direction of drum rotation indicated by arrow b in FIG. 9 (which is opposite to the main scanning direction) and the angle of inclination and the LD array pitch pf on the image plane are as shown in FIG. 9, i.e., the points of exposure with light beams L from the individual fibers coincide with the positions of integral pixels on the recording material (image plane) A which correspond to the grid points in FIG. 9; in the illustrated case, the points of exposure are located one pixel apart in the main scanning direction and two pixels apart in the auxiliary scanning direction.

Thirdly, the direction of deflection is such that when a point of exposure moves by a specified distance (in the illustrated case, by half a pixel in the main scanning direction) to be deflected to an adjacent line, said point of exposure will be located in the position of an integral pixel which, in the illustrated case, is one pixel away in the auxiliary scanning direction.

Specific discussion is now made with reference to FIG. 9 writing p for the pitch of pixels. A light beam L exposes the position of one pixel on a certain line (odd line) with a specified diameter of spot (indicated by a solid dot in FIG. 9); thereafter, the beam L moves by (½)p in the main scanning direction while at the same time it is deflected by $(\sqrt{5}/2)$p in the array direction so as to expose the position of a pixel on an adjacent line (even line) which is adjacent the first mentioned pixel in the auxiliary scanning direction but opposite to the case shown in FIG. 3; again, the beam L moves by (½)p in the main scanning direction while at the same time it is deflected by $(\sqrt{5}/2)$p in opposite direction which is parallel to the array direction so as to expose the position of a pixel on the initial odd line which is adjacent the first mentioned pixel in the main scanning direction. This process is repeated. An adjacent light beam L which is distant by the LD array pitch (fiber pitch) pf ($=\sqrt{5}$p) repeats the same process of exposing two lines, odd and even lines. In this way, the illustrated imaging unit 60 performs a complete blanket exposure of the recording material A with multi-beams, thereby recording a latent or visible image.

Unlike the AOD and AOM, the EOD used as the fine deflecting device does not rely upon diffraction for its operation. Hence, the direction of deflection by the EOD is not limited to one single direction which is perpendicular to the array direction of multi-beams but may be parallel to it as in the fourth embodiment of the invention which is shown in FIGS. 8A and 8B. If desired, the direction of deflection by the EOD may be perpendicular to the array direction of multi-beams as in the case of AOD and AOM.

Figure 10A:
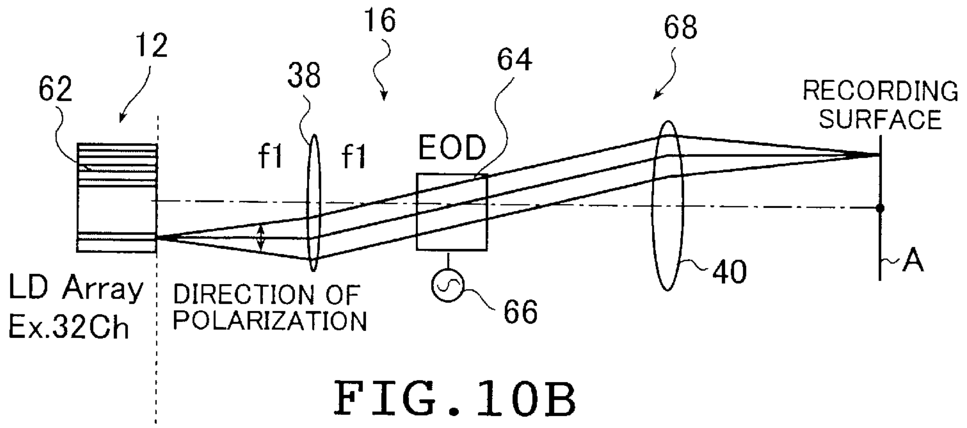
FIG. 10A is a simplified front view of a fifth example of the imaging unit in the multi-beam exposure apparatus of FIG. 1 as seen in a direction perpendicular to the direction in which optical fibers are arranged in the LD array.
Figure 10B:
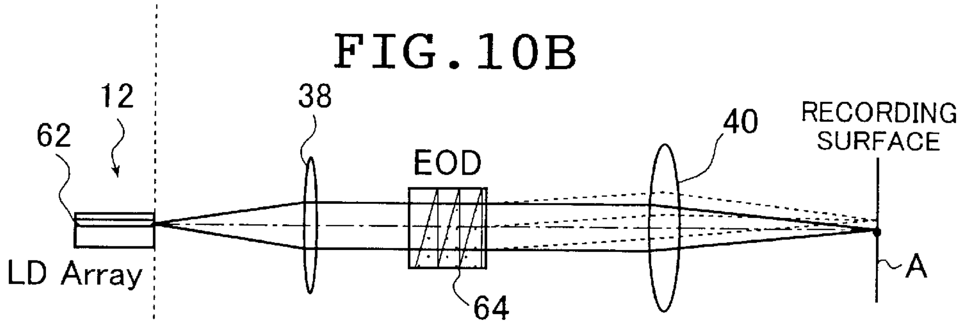
FIG. 10B is a simplified bottom view of the imaging unit as seen in the array direction of the LD array.

FIGS. 10A and 10B show the exposing apparatus (imaging unit) 68 according to a fifth embodiment of the invention in which the multi-beams from a monolithic LD array are subjected to 2-pixel fine deflection by EOD in a direction normal to the array direction of the multi-beams.

The exposing apparatus 68 shown in FIGS. 10A and 10B is the same as the exposing apparatus 60 shown in FIGS. 8A and 8B except that the orientation of EOD 64 is rotated by 90 degrees. Because of this design, the multi-beams L emitted from the monolithic LD array 62 are subjected to fine deflection in a direction normal to its array direction as shown in FIG. 10B.

Thus, the loci of beam spots that are drawn by exposure with multi-beams as they are subjected to 2-pixel fine deflection in the fifth embodiment of the invention are entirely the same as shown in FIG. 3 and need not be described in detail.

Described above is the basic structure of the exposing apparatus (imaging units) 60 and 68 in the fourth and fifth embodiments of the invention which perform two-pixel fine deflection by EOD of the light beams from the monolithic LD array.

Figure 11:
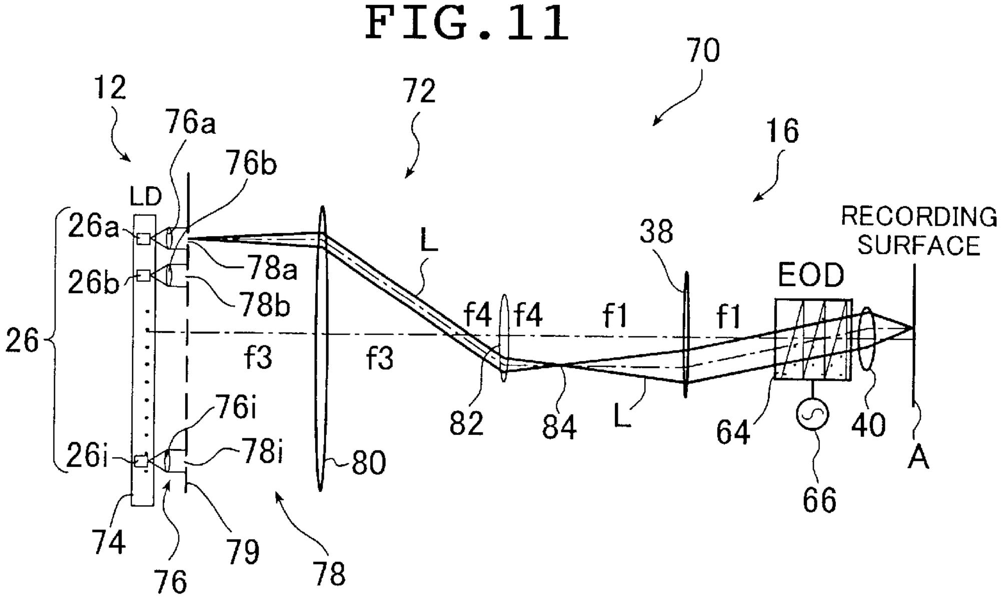
FIG. 11 is a simplified front view of a sixth example of the imaging unit in the multi-beam exposure apparatus of FIG. 1 as seen in a direction perpendicular to the array direction of the LD array.

FIG. 11 is a simplified front view of the exposing apparatus (imaging unit) 70 in a sixth embodiment of the invention which performs two-pixel fine deflection by EOD of light from an array of discrete LDs as it is seen in a direction perpendicular to the array direction of the LD array.

The exposing apparatus (imaging unit) 70 shown in FIG. 11 has the same construction as the exposing apparatus (imaging unit) 60 shown in FIG. 8A except for the light source portion 12 and part of the optical unit. Hence, like constituent elements are identified by like reference numerals and will not be described in detail.

The exposing apparatus (imaging unit) 70 shown in FIG. 11 comprises the light source portion 12, an optical unit comprising reducing optics 72 and imaging optics 16, fine deflecting portion 18 and main scanning portion 14.

In the exposing apparatus 70, the light source portion 12 comprises an LD array 74 having a plurality of discrete LDs 26*a*, 26*b*, . . . , 26*i* disposed in array form, collimator lenses 76 (76*a*, 76*b*, . . . , 76*i*) disposed at the exit ends of the LDs 26 (26*a*–26*i*), and a perforated plate 79 having apertures 78

(78*a*, 78*b*, . . . , 78*i*) made in correspondence to the respective collimator lenses 76 (76*a*–76*i*). This light source portion 12 is used in place of the monolithic LD array 62 shown in FIG. 8A.

The discrete LDs 26 used in the sixth embodiment may be of a single or multi-single mode and various known LDs can be used without particular limitation. In the illustrated case of the light source portion 12, the LD array 74 emitting multi-beams, collimator lenses 76 and apertures 78 may be combined in any fashion and arranged in either a one-dimensional or two-dimensional pattern.

The discrete LDs 26 are comparatively of a large size and the emitted multi-beams cannot be arranged as closely as when the fiber array 30 or monolithic LD array 62 is used. Accordingly, the apertures 78 are 1–3 mm in size. If the spots formed on the recording surface of the recording material A are 10–15 $\mu$m in size, the reduction ratio is between 1/100 and 1/200. With this small value, the imaging optics 16 solely composed of the collimator lens 38 and the imaging lens 40 as in the imaging units 34, 50, 56, 60 and 68 which are shown in FIGS. 2A, 4A, 6, 8A and 10A, respectively, cannot achieve image reduction down to the desired spot size on the recording material A in the main scanning portion 14. To deal with this situation, the optical unit shown in FIG. 11 has reducing optics 72 provided ahead of the imaging optics 16 (between the exposing portion 12 and the imaging optics 16).

The reducing optics 72 comprise a collimator lens 80 and an imaging lens 82. This is not the sole case of the invention and the lenses 80 and 82 may be combined with various other lenses. Alternatively, known reducing optics may be employed or a plurality of reducing optics may be provided in multiple stages. In FIG. 11, the perforated plate 79 is provided immediately downstream of the collimator lenses 76 (76*a*–76*i*) in the light source portion 12. Alternatively, the perforated plate 79 itself or another perforated plate having apertures corresponding to the apertures 78 may be provided in position 84 which is the focal point of the imaging lens 82 in the reducing optics 72.

The sixth embodiment under consideration is not limited to the case where the EOD 64 in the fine deflecting portion 18 is disposed as shown in FIG. 11 and the direction of fine deflection is parallel to the array direction of the LD array 74. If desired, the EOD 64 may be rotated by 90 degrees as shown in FIGS. 10A and 10B so that the direction of fine deflection is normal to the array direction of LD array 74. In the fine deflecting portion 18, the EOD 64 may be replaced by an AOD or AOM as shown in FIG. 2A or 6.

Thus, the loci of beam spots that are drawn by exposure with multi-beams as they are subjected to 2-pixel fine deflection in the sixth embodiment of the invention are entirely the same as shown in FIG. 3 and need not be described in detail.

Described above is the basic structure of the exposing apparatus (imaging unit) 70 in the sixth embodiment of the invention which performs two-pixel fine deflection by EOD of the light beams from the discrete LD array.

When EOD 64 is used, a light source capable of controlling the direction of polarization of emitted light beams is used in the light source portion 12, as exemplified by the monolithic LD array 62 (see FIGS. 8A and 8B and FIG. 10) and the discrete LD array 74 (see FIG. 11). This is for ensuring that the direction of polarization of light beams agrees with the array direction of multi-beams. However, if multi-mode fiber array 30 is used in the light source portion 12, the light beams emitted from the individual optical fibers 22 in the multi-mode fiber array 30 cannot have a definite direction of polarization.

Figure 12A:
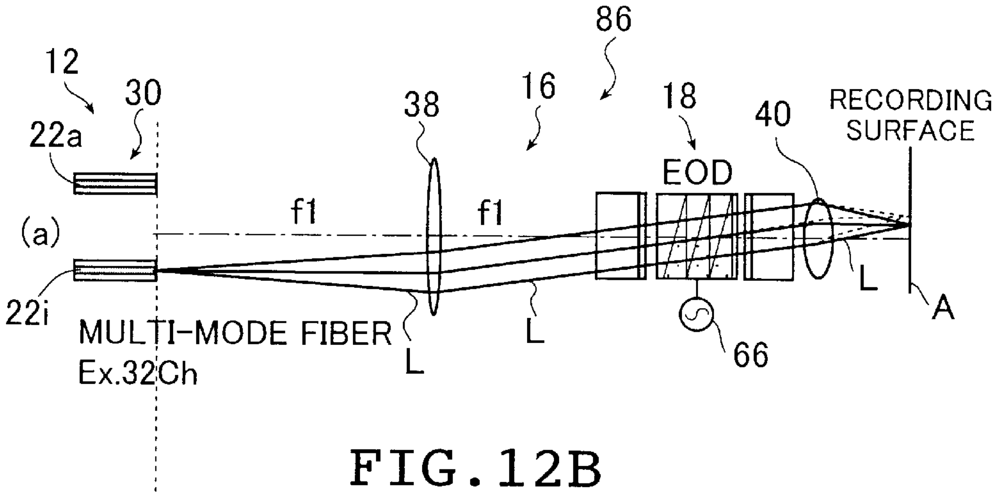
FIG. 12A is a simplified front view of a seventh example of the imaging unit in the multi-beam exposure apparatus of FIG. 1 as seen in a direction perpendicular to the direction in which optical fibers are arranged in a fiber array.
Figure 12B:
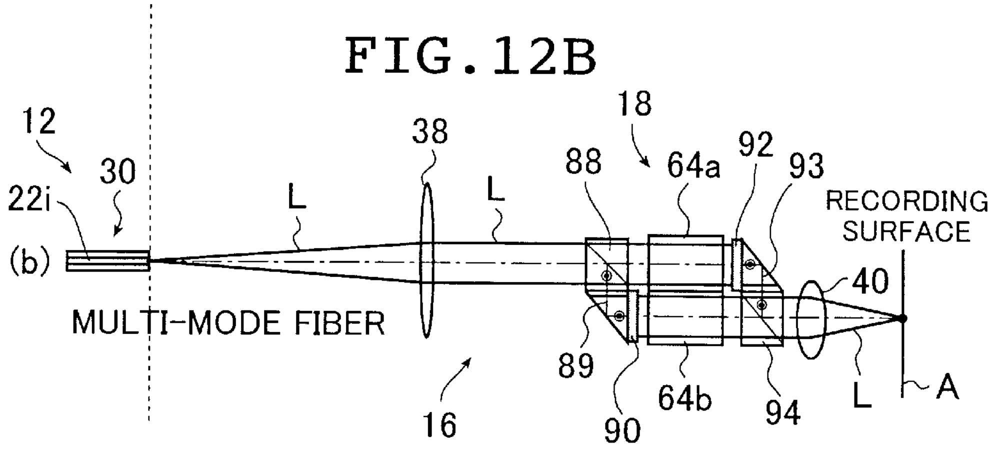
FIG. 12B is a simplified bottom view of the imaging unit as seen in the array direction of the fiber array.

To deal with this situation, the design shown in FIGS. 12A and 12B is preferably adopted if multi-mode fiber array 30 is used in the light source portion 12. To be specific, light beams having different directions of polarization are split in a position upstream of EOD 64 in the fine deflecting portion 18 and the split light beams are processed to have the same direction of polarization; after this processing, the split light beams are passed through EOD 64 for fine deflection and the fine deflected, split beams are reverted to have the initial relationship for the direction of polarization; the split beams are then combined together and output from the fine deflecting portion 18.

FIG. 12A is a simplified front view of the exposing apparatus (imaging unit) 86 in a seventh embodiment of the invention which performs two-pixel fine deflection by EOD of light from a fiber array as it is seen in a direction perpendicular to the array direction, and FIG. 12B is a simplified bottom view of the same exposing apparatus as it is seen in the array direction.

The exposing apparatus (imaging unit) 86 shown in FIGS. 12A and 12B has the same construction as the exposing apparatus (imaging unit) 60 shown in FIGS. 8A and 8B except for the light source portion 12 and the fine deflecting portion 18. Hence, like constituent elements are identified by like reference numerals and will not be described in detail.

In the exposing apparatus 86, the light source portion 12 consists of the fiber array 30 (see FIGS. 2A and 2B) in place of the monolithic LD array 62 shown in FIG. 8A.

The fine deflecting portion 18 consists of a first polarized beam splitter 88, a first right-angle prism 89, a first λ/2 plate 90, two EODs 64*a* and 64*b*, a second λ/2 plate 92, a second right-angle prism 93, a second polarized beam splitter 94, and a drive power source 66 for driving the two EODs.

The exposing apparatus 86 operates in the following manner. Multi-mode fiber array 30 emits light beams which are collimated by passage through the collimator lens 38. The collimated light beams L are launched into the first polarized beam splitter 88 which passes a first beam component having a specified direction of polarization while reflecting by 90 degrees a second beam component which is polarized in a direction perpendicular to the direction of polarization of the first beam component. The thus separated second beam component is incident on the first right-angle prism 89, bent by 90 degrees in its travelling direction to become parallel to the first beam component, launched into the first λ/20 plate 90 and its direction of polarization is rotated by 90 degrees to become the same as the direction of polarization of the first beam component. The first and second beam components are now parallel beams having the same direction of polarization and launched into the first and second EODs 64*a* and 64*b*, respectively, so that they undergo fine deflection in the same manner.

The first beam component that has been subjected to fine deflection by the first EOD 64*a* is launched into the second λ/2 plate 92 and has its direction of polarization rotated by 90 degrees; thereafter, the first beam component is incident on the second right-angle prism 93 and bent by 90 degrees in the direction of its travel. The first beam component is then launched into the second polarized beam splitter 94 together with the second beam component that has been subjected to fine deflection by the second EOD 64*b*. The two beam components offset by 90 degrees in the direction of polarization are combined in the second polarized beam splitter 94.

The combined light beams L are incident on the imaging lens 40 through which they pass to form an image on the recording surface of the recording material A in the main scanning portion 14.

The loci of beam spots that are drawn by exposure with multi-beams as they are subjected to 2-pixel fine deflection in the seventh embodiment of the invention are entirely the same as shown in FIG. 3 and need not be described in detail.

Described above is the basic structure of the exposing apparatus (imaging unit) 86 in the seventh embodiment of the invention which performs two-pixel fine deflection by EOD of the light beams from the fiber array.

The claddings of the optical fibers in the fiber array used in the invention (as typically indicated by 30 in FIG. 2) have diameters of about 80–125 $\mu$m, which are either identical or essentially the same irrespective of whether the fibers are multi-mode or single-mode fibers. On theother hand, the core which is a transmitter of light beams has a diameter of about 50–100 $\mu$m in the case of multi-mode fiber and a diameter of about 5–10 $\mu$m in the case of single-mode fiber. Thus, the cladding diameter of single-mode fibers is much larger than the core diameter, so even if the fibers are arranged in contact with each other, the distance between the cores of adjacent optical fibers cannot be made smaller than the cladding diameter and the spots of adjacent light beams formed on the image plane (recording surface) of the recording material A and which correspond to the fiber core cannot be brought closer than a specified distance. See FIG. 13 for clarification. On the image plane, beam spots $B_{SP}$ that correspond to the fiber core and which are represented by solid dots or clear circles are required to have a predetermined size with respect to the pixel pitch p, so the distance between adjacent beam spots $B_{SP}$ or the fiber pitch pf on the image plane cannot be made smaller than $D_{CD}$ which is the cladding diameter of each fiber.

Figure 13:
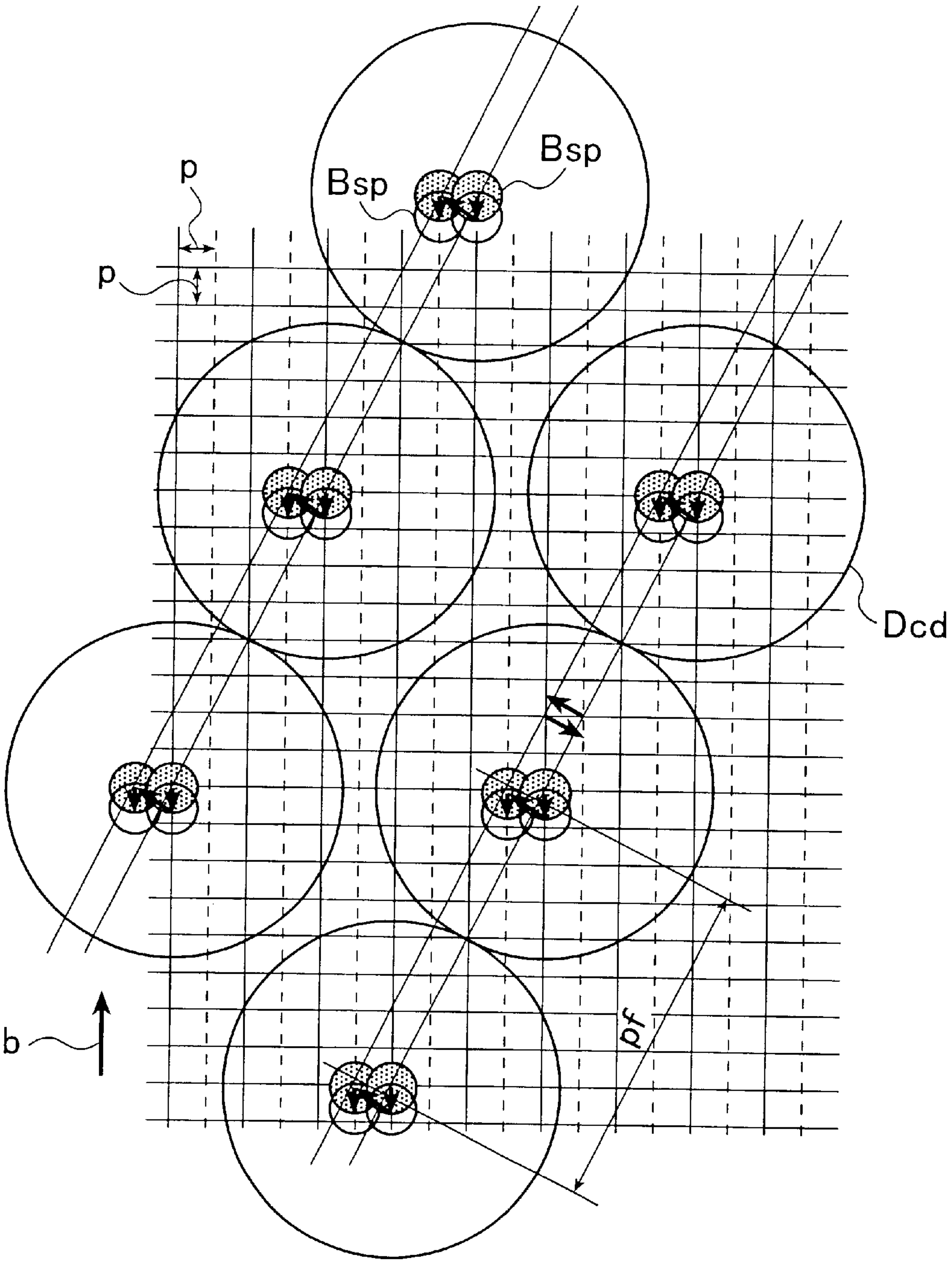
FIG. 13 is an illustration showing how the two-dimensional fiber array in the multi-beam exposure apparatus of FIG. 1 is oriented on the image plane and how multi-beams from the fiber array may be subjected to 2-pixel fine deflection on the image plane.

To overcome this limitation, fiber arrays are disposed in a two-dimensional pattern, typically in two rows as shown in FIG. 13 and the lines (main scanning lines) that cannot be exposed by the first row of fibers are exposed by the second row. If necessary, a third and more rows of fibers may be provided to ensure that all lines (main scanning lines) are exposed and scanned in the auxiliary scanning direction. FIG. 13 shows the case of using a two-dimensional fiber array consisting of two fiber rows and adjacent beam spots $B_{SP}$ in each row are spaced apart by 8 pixels in the main scanning direction; since m or the number of fine deflections to be performed is one, the pitch of pixels in the auxiliary scanning direction is 2(m+1) and adjacent beam spots $B_{SP}$ are spaced apart by 4 pixels in the auxiliary scanning direction. As a result, the pitch of fibers pf in each row as measured on the image plane is $4\sqrt{5}p$ (p is the pixel pitch). In the case shown in FIG. 13, the light beams emitted from each fiber row are subjected to fine deflection in the same manner as shown in FIG. 3, namely by $\sqrt{5}p/2$ in a direction perpendicular to the array direction of the fiber arrays.

In the illustrated case, the two-dimensional fiber array is composed of two fiber rows. If desired, three or more fiber rows may be provided to perform exposure with a two-dimensional multi-beam array.

The two-dimensional multi-beam array mentioned above is a two-dimensional pattern of single-mode fiber arrays but this is not the sole example of the invention and various other arrays of light sources including laser arrays such as multi-mode fiber arrays, monolithic LD arrays and discrete LD arrays may be arranged in a two-dimensional pattern.

In the illustrated case, two-pixel fine deflection is performed but fine deflection may of course be effected for three or more pixels.

In the case shown in FIG. 13, the gaps between fibers that could not be exposed by a desired spot size if the fibers array consisted of only one fiber row are filled up by arranging the fibers in two or more rows so that no fiber gaps will remain unexposed. This is not the sole case of the invention and the same effect can be achieved by a single fiber row if interlaced exposure is performed in the manner shown in FIG. 14.

Figure 14:
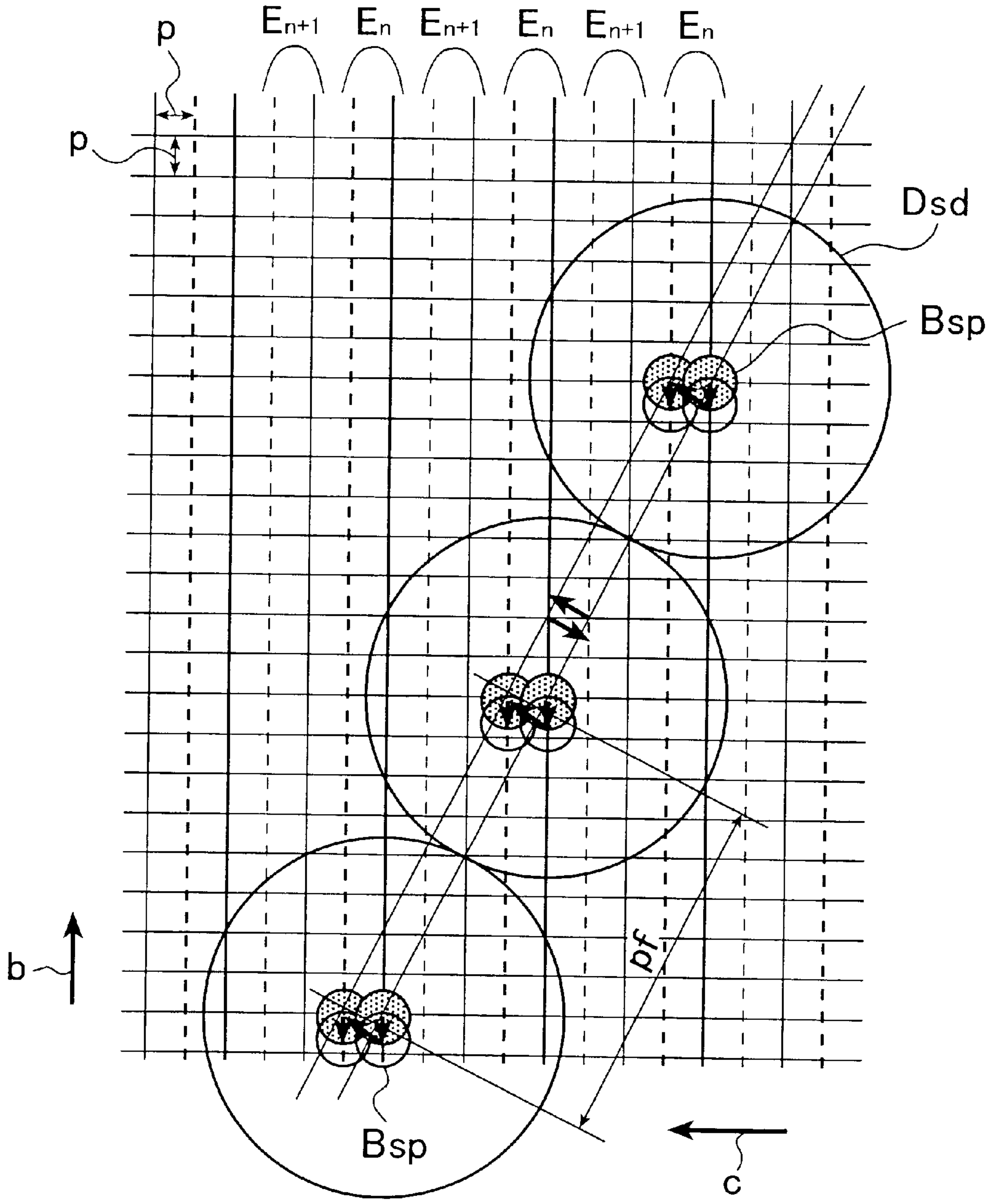
FIG. 14 is an illustration showing how the fiber array in the multi-beam exposure apparatus of FIG. 1 is oriented on the image plane and how multi-beams from the fiber array may be subjected to interlaced 2-pixel fine deflection on the image plane.

In the case shown in FIG. 14, multi-beams from a single fiber row are first subjected to 2-pixel fine deflection in the same manner as shown in FIG. 13, whereby more than one pair of two lines indicated by En are simultaneously exposed by the nth main scan (drum rotation); then, the multi-beams from the single fiber row are relatively moved in the auxiliary scanning direction (indicated by arrow c) and the pair of two lines indicated by $E_{n+1}$ which are located between the two line pairs indicated by $E_n$ are exposed by the next (n+1)th main scan. By performing interlaced exposure in this manner, a fiber array consisting of only one fiber row suffices for exposing the entire recording surface without leaving any areas unexposed even if they are gaps between fibers.

In the illustrated case, all gaps that remain unexposed by a single main scan are filled up by two consecutive main scans. This is not the sole case of the invention and the two main scans that are performed to fill up the gaps between fibers may or may not be consecutive. If desired, three or more consecutive or non-consecutive main scans may be performed to fill up the gaps between fibers.

In the illustrated case, the fiber array with which the interlaced exposure is performed is a single-mode fiber array but this is not the sole example of the invention and various other arrays of light sources including laser arrays such as a multi-mode fiber array, a monolithic LD array and a discrete LD array may be employed.

In the illustrated case, two-pixel fine deflection is performed but fine deflection may of course be effected for three or more pixels.

The following examples are provided for further illustrating the multi-beam exposure apparatus of the invention.

EXAMPLES 1 AND 2

Models of the multi-beam exposure apparatus 10 shown in FIG. 1 which had the imaging unit 34 according to the first embodiment of the invention (see FIGS. 2A and 2B and FIG. 3) were designed and constructed. The exposure apparatus 10 would perform two-pixel fine deflection by AOD 42 of the light beams emitted from the fiber array 30. On the image plane (recording surface) of the recording material A on the drum 32, the array direction of the fiber array 30 formed an angle of 34 degrees with the main scanning direction; the optics had an efficiency of 90%; the AOD 42 having an efficiency of 80% was made of tellurium dioxide ($TeO_2$) and generated longitudinal waves at a velocity (Va) of 4260 m/s.

The specifications of the exposing system are shown in Table 1 and other exposing parameters as well as the descriptions of the fiber array (fiber bound LD array) 30 and AOD 42 are shown in Table 2.

TABLE 1

Specifications of Exposing System

| Parameters | | Unit | Value |
|---|---|---|---|
| Exposure size | Lx | mm | 1,100 |
| | Ly | mm | 950 |
| Resolution | | dpi | 2,400 |
| Dot pitch | dp | μm | 10.58 |
| Main scan duty | dy | | 0.850 |
| Recording spot diameter | | μm | 14.8 |

TABLE 2

| | | | Ex. 1 | Ex. 2 | Com. Ex. 1 |
|---|---|---|---|---|---|
| Exposing system | | | | | |
| exposure time | T | min | 1.79 | 1.49 | 4.0 |
| drum rotating speed | R | rpm | 906 | 1087 | 812 |
| number of pixels under fine deflection | nd | | 2 | 2 | 1 |
| linear velocity | v | m/sec | 16.9 | 20.2 | 15.1 |
| AOD*optics efficiency | η | | 0.5 | 0.5 | 0.31 |
| Fiber coupled LD | | | | | |
| optical power from fiber end | P | W | 1.00 | 1.20 | 1.00 |
| core diameter | d | μm | 60 | 40 | |
| fiber array pitch | p | μm | 103 | 69 | |
| inclination | | deg. | 34 | 34 | |
| number of channels | nf | | 32 | 32 | 32 |
| AOD | | | | | |
| angle for oblique incidence (by half) | $\theta_{array}$ | deg. | 23 | 18 | |
| beam diameter | W | μm | 668 | 557 | |
| deflection frequency | δf | MHz | 104 | 83 | |
| switching time | τ/2n | nsec | 157 | 131 | |

COMPARATIVE EXAMPLE 1

As a comparison, a model of the multi-beam recording apparatus described in Japanese Patent Application (JPA) No. 186490/1994 was designed and constructed.

As in Examples 1 and 2, the optics had an efficiency of 90%. The specifications of the exposing system are shown in Table 1 and the other exposing parameters as well as the descriptions of the LD array and AOD are shown in Table 2.

As is clear from Table 2, the exposure time that was four minutes with the comparative sample was reduced toless than half by using the apparatus of Example 1 (1.8 minutes) and the apparatus of Example 2 (1.5 minutes)

EXAMPLE 3

A model of the multi-beam exposure apparatus 10 shown in FIG. 1 which had the imaging unit 50 according to the second embodiment of the invention (see FIGS. 4A and 4B and FIG. 5) was designed and constructed. The exposure apparatus 10 would perform three-pixel fine deflection by AOD 42 of the light beams emitted from the fiber array 30. On the image plane (recording surface) of the recording material A on the drum 32, the array direction of the fiber array 30 formed an angle of 18 degrees with the main scanning direction; the optics had an efficiency of 90%; the fiber efficiency was 80%; the AOD 42 having an efficiency of 80% was made of tellurium dioxide ($TeO_2$) and generated longitudinal waves at a velocity (Va) of 4260 m/s.

The specifications of the exposing system are shown in Table 3 and other exposing parameters as well as the descriptions of the fiber array (fiber bound LD array) 30 and AOD 42 are shown in Table 4.

TABLE 3

Specifications of Exposing System

| Parameters | | Unit | Value |
|---|---|---|---|
| Exposure size | Lx | mm | 1,100 |
| | Ly | mm | 950 |
| Resolution | | dpi | 2,400 |
| Dot pitch | dp | μm | 10.58 |
| Main scan duty | dy | | 0.850 |
| Recording spot diameter | | μm | 14.8 |

TABLE 4

| | | | Ex. 3 | Com. Ex. 2 |
|---|---|---|---|---|
| Exposing system | | | | |
| exposure time | T | min | 1.0 | 4.2 |
| drum rotating speed | R | rpm | 1082 | 776 |
| number of pixels under fine deflection | nd | | 3 | 1 |
| linear velocity | v | m/sec | 20.2 | 14.5 |
| AOD*optics efficiency | η | | 0.5 | 0.3 |
| Fiber coupled LD | | | | |
| optical power from fiber end | P | W | 1.79 | 1.00 |
| core diameter | d | μm | 56 | |
| fiber array pitch | p | μm | 126 | |
| inclination | | deg. | 18 | |
| number of channels | nf | | 32 | 32 |
| AOD | | | | |
| angle for oblique incidence (by half) | $\theta_{array}$ | deg. | 21 | |
| beam diameter | W | μm | 373 | |
| deflection frequency | δf | MHz | 203 | 0 |
| switching time | τ/2n | nsec | 87.5 | |

COMPARATIVE EXAMPLE 2

As a comparison, a model of the multi-beam recording apparatus described in Japanese Patent Application (JPA) No. 186490/1994 was designed and constructed.

The optics had an efficiency of 30%. The specifications of the exposing system are shown in Table 3 and the other exposing parameters as well as the descriptions of the LD array and AOD are shown in Table 4.

As is clear from Table 4, the exposure time that was 4.2 minutes with the apparatus of Comparative Example 2 was reduced to less than a quarter by using the apparatus of Example 3 (1.0 minute).

While the multi-beam exposure apparatus of the invention has been described above in detail by referring to various embodiments, the invention is by no means limited to those embodiments and it should be understood that various improvements and design modifications can be made without departing from the scope and spirit of the invention.

As described in detail on the foregoing pages, the apparatus of the invention is suitable for high-density recording on large-size recording materials by multi-beam exposure and the exposure time can be shortened without substantial increase in the number of light beams emitted from light sources such as semiconductor lasers and without increasing the main scan speed such as the rotating speed of the external drum.

The absence of the need for increasing the main scan speed such as the drum rotating speed offers the added advantage of safety.

A further advantage of the invention apparatus is that it uses a smaller number of components and can hence be manufactured at lower cost.

The smaller number of components used contributes to a lower failure rate of the light source such as a semiconductor laser.

As a result of these advantages, the apparatus of the invention increases the reliability of the overall exposing system, allows for shorter shutdown times and requires less cost for servicemen.

What is claimed is:

1. A multi-beam exposure apparatus comprising:

a light source for emitting a specified number of multi-beams spaced apart in a direction of auxiliary scanning;

a deflecting unit for deflecting said specified number of multi-beams collectively on main scanning lines by a specified number of deflections such that a space between adjacent ones of said specified number of multi-beams is exposed; and a main scanning unit for performing main scan of a recording material as it is exposed with said specified number of multi-beams, wherein the space between adjacent ones of said specified number of multi-beams is an integral multiple of (said specified number of deflections +1) multiplied by a pitch of pixels in the direction of auxiliary scanning.

2. The multi-beam exposure apparatus according to claim 1, wherein said main scanning unit is a rotating outer drum having said recording material fitted on its peripheral surface.

3. The multi-beam exposure apparatus according to claim 1, wherein said light source is multi-beam emitting unit in array form.

4. The multi-beam exposure apparatus according to claim 1, wherein said light source is an optical fiber array emitting said multi-beams.

5. The multi-beam exposure apparatus according to claim 1, wherein said light source is an array of discrete semiconductor lasers emitting individual beams.

6. The multi-beam exposure apparatus according to claim 1, wherein said light source is a monolithic semiconductor laser array emitting said multi-beams.

7. The multi-beam exposure apparatus according to claim 1, further comprising a collimator lens provided between said light source and said deflecting unit and an imaging lens provided between said deflecting unit and said recording material.

8. The multi-beam exposure apparatus according to claim 7, further comprising reducing optics provided in a plurality of stages between said deflecting unit and said collimator lens.

9. The multi-beam exposure apparatus according to claim 1, wherein said deflecting unit has an acousto-optic effect device.

10. The multi-beam exposure apparatus according to claim 9, wherein said acousto-optic effect device is an acousto-optic deflector.

11. The multi-beam exposure apparatus according to claim 9, wherein said acousto-optic effect device is an acousto-optic modulator.

12. The multi-beam exposure apparatus according to claim 11, wherein light of first-order diffraction and that of zeroth-order diffraction as being output from said acousto-optic modulator are adjusted to have equal intensity.

13. The multi-beam exposure apparatus according to claim 9, wherein said multi-beams are deflected by said acousto-optic effect device in a direction perpendicular to a direction in which said multi-beams are arranged.

14. The multi-beam exposure apparatus according to claim 9, wherein a direction of ultrasonic propagation from said acousto-optic effect device is adjusted to be perpendicular to a direction in which said multi-beams are arranged.

15. The multi-beam exposure apparatus according to claim 1, wherein said deflecting unit has an optical device capable of electro-optic effect.

16. The multi-beam exposure apparatus according to claim 15, wherein said multi-beams are deflected by said optical device capable of the electro-optic effect in a direction parallel to a direction in which said multi-beams are arranged.

17. The multi-beam exposure apparatus according to claim 15, wherein said multi-beams are deflected by said optical device capable of the electro-optic effect in a direction perpendicular to a direction in which said multi-beams are arranged.

18. The multi-beam exposure apparatus according to claim 15, wherein said deflecting unit comprises:

a polarized beam splitting device for separating said multi-beams into two components according to a direction of polarization;

a first polarization rotating device by which the direction of polarization of the component separated by said polarized beam splitting device is rotated so that said direction is parallel to the direction of polarization of the component that has passed through said polarized beam splitting device;

a first and a second entity of said optical device capable of the electro-optic effect which respectively deflect a component that has passed through said polarized beam splitting device and a component that has been rotated in the direction of polarization by said first polarization rotating device;

a second polarization rotating device for rotating the direction of polarization of a component that has been deflected by said first entity of said optical device capable of the electro-optic effect; and a wave coupling device by which a component of multi-beams that has been rotated in the direction of polarization by said second polarization rotating device is combined with a component that has been deflected by said second entity of said optical device capable of the electro-optic effect.

19. The multi-beam exposure apparatus according to claim 3, wherein said multi-beam emitting unit in array form are arranged in more than one arrow and the pixels that remain unrecorded between the multi-beams emitted from a single row of said multi-beam emitting unit are thoroughly recorded by the multi-beams emitted from all other rows of said multi-beam emitting unit.

20. The multi-beam exposure apparatus according to claim 3, wherein the pixels that remain unrecorded between the multi-beams emitted from said multi-beam emitting unit in array form are thoroughly recorded by interlaced exposure.

21. The multi-beam exposure apparatus according to claim 1, wherein said recording material is a photoreceptor, a light-sensitive material or a heat-sensitive material.

* * * * *